United States Patent
Naito et al.

(10) Patent No.: US 9,826,406 B2
(45) Date of Patent: *Nov. 21, 2017

(54) INFORMATION PROCESSING APPARATUS, NETWORK CONTROL APPARATUS, WIRELESS COMMUNICATION APPARATUS, COMMUNICATION SYSTEM, AND INFORMATION PROCESSING METHOD

(75) Inventors: Masahiko Naito, Tokyo (JP); Katsutoshi Itoh, Tokyo (JP); Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 580 days.

This patent is subject to a terminal disclaimer.

(21) Appl. No.: 14/112,055

(22) PCT Filed: Apr. 20, 2012

(86) PCT No.: PCT/JP2012/002735
§ 371 (c)(1),
(2), (4) Date: Oct. 16, 2013

(87) PCT Pub. No.: WO2012/147316
PCT Pub. Date: Nov. 1, 2012

(65) Prior Publication Data
US 2014/0045466 A1 Feb. 13, 2014

(30) Foreign Application Priority Data

Apr. 27, 2011 (JP) .................. 2011-098979

(51) Int. Cl.
*H04M 1/66* (2006.01)
*H04W 12/10* (2009.01)
(Continued)

(52) U.S. Cl.
CPC ........... *H04W 12/10* (2013.01); *H04W 4/005* (2013.01); *H04W 4/08* (2013.01);
(Continued)

(58) Field of Classification Search
CPC ...... H04W 12/06; H04W 12/08; H04W 12/10
(Continued)

(56) References Cited

U.S. PATENT DOCUMENTS

2012/0149328 A1* 6/2012 Chakraborty ..... H04M 3/42238
455/411

FOREIGN PATENT DOCUMENTS

| JP | 2008-109527 | 5/2008 |
| JP | 2010-532107 | 9/2010 |
| WO | WO 2005-086519 | 9/2005 |

OTHER PUBLICATIONS

3GPP TR 33.812 V9.2.0 (Jun. 2010). $3^{rd}$ Generation Partnership Project; Technical Specification Group Services and System Aspects; Feasibility study on the security aspects of remote provisioning and change for subscription for Machine to Machine (M2M) equipment (Release 9). Jun. 2010.

* cited by examiner

Primary Examiner — Temica M Beamer
(74) Attorney, Agent, or Firm — Chip Law Group

(57) ABSTRACT

An information processing apparatus and method provide logic for processing information. In one implementation, an information processing apparatus may include a receiving unit configured to receive, from a first communications device, a request for information identifying at least one second communications device. In such implementations, the second communications device may be associated with the first communications device, and the first and second communications devices may share at least one connection right. The information processing apparatus may also include a control unit configured to obtain the information, based on the received request, and generate an instruction to transmit the information to the first communications device.

18 Claims, 16 Drawing Sheets

(51) Int. Cl.
*H04W 4/00* (2009.01)
*H04W 4/08* (2009.01)
*H04W 12/06* (2009.01)

(52) U.S. Cl.
CPC ............... *H04M 2203/2044* (2013.01); *H04M 2203/6081* (2013.01); *H04W 12/06* (2013.01)

(58) Field of Classification Search
USPC .................................. 455/411, 432.3, 552.1
See application file for complete search history.

[Fig. 1(a)]
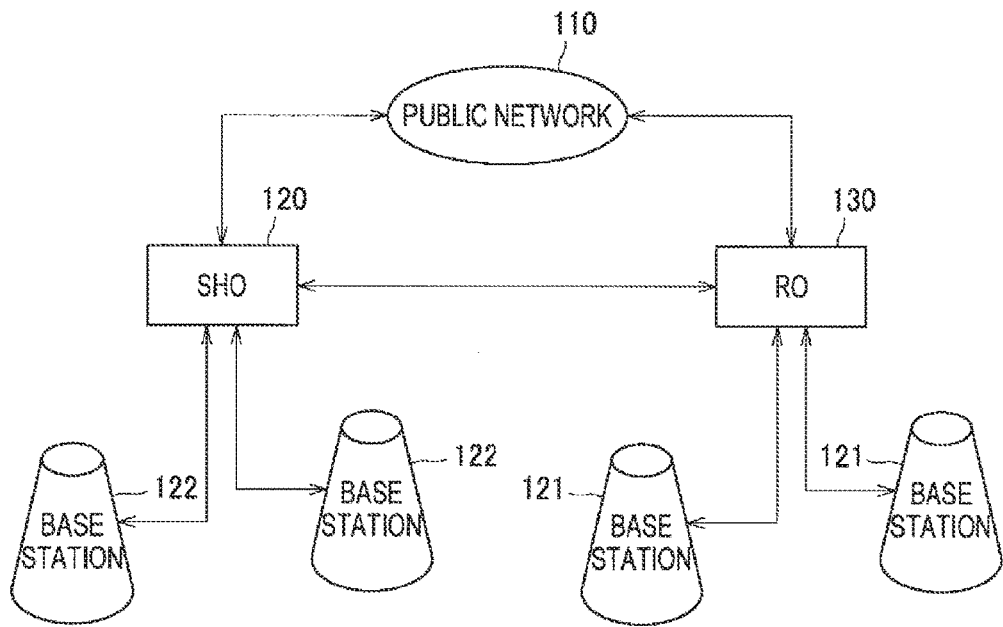
[Fig. 1(b)]
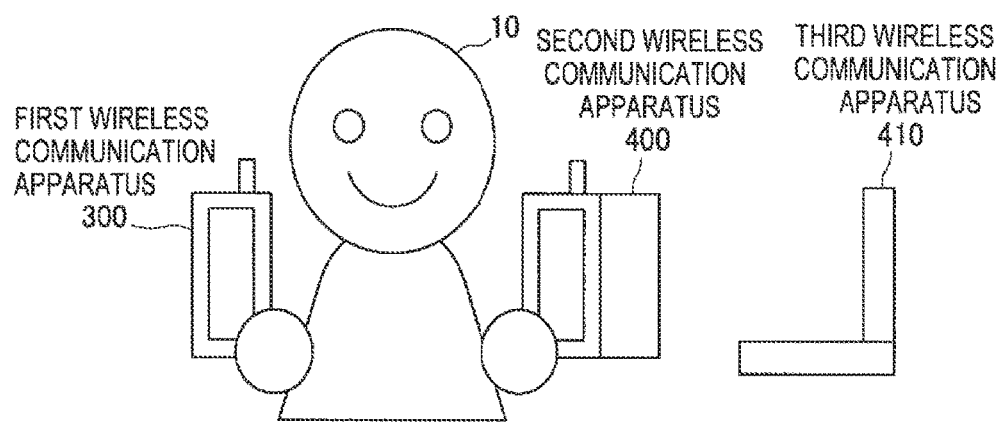

[Fig. 2]
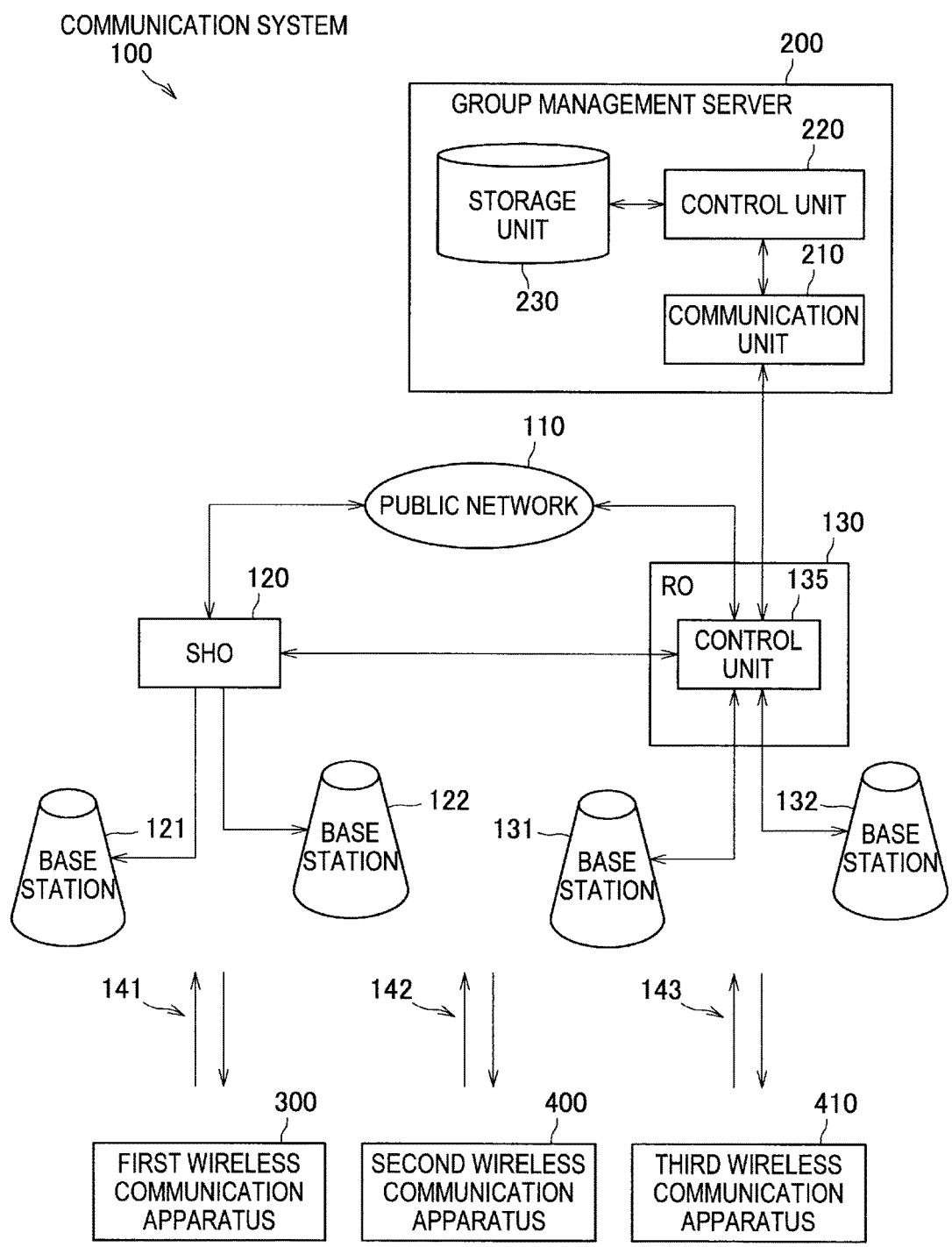

[Fig. 3]
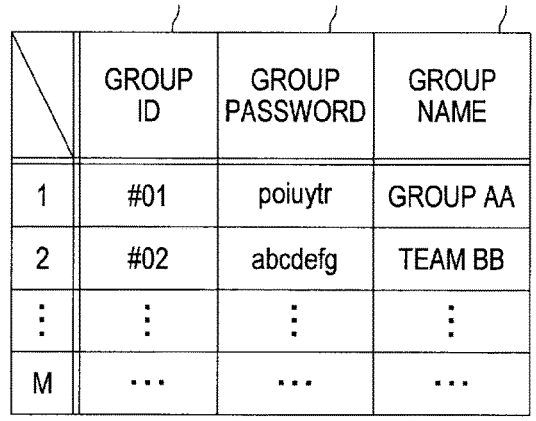
GROUP MANAGEMENT DATABASE 240
(a)
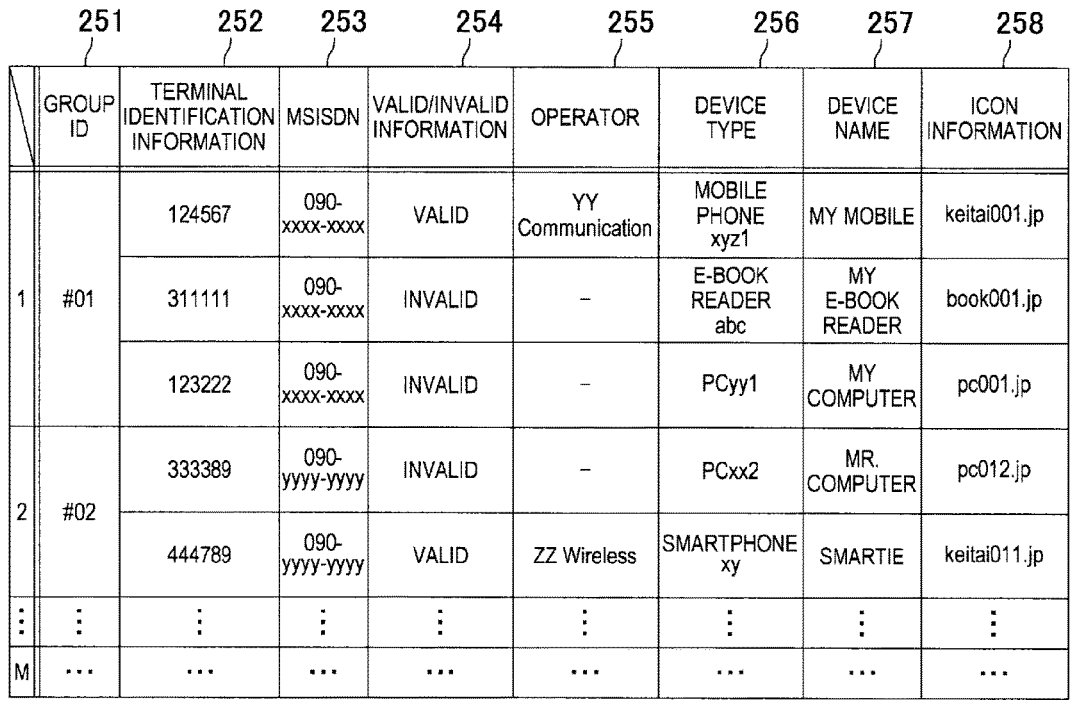
TERMINAL MANAGEMENT DATABASE 250
(b)

[Fig. 4]
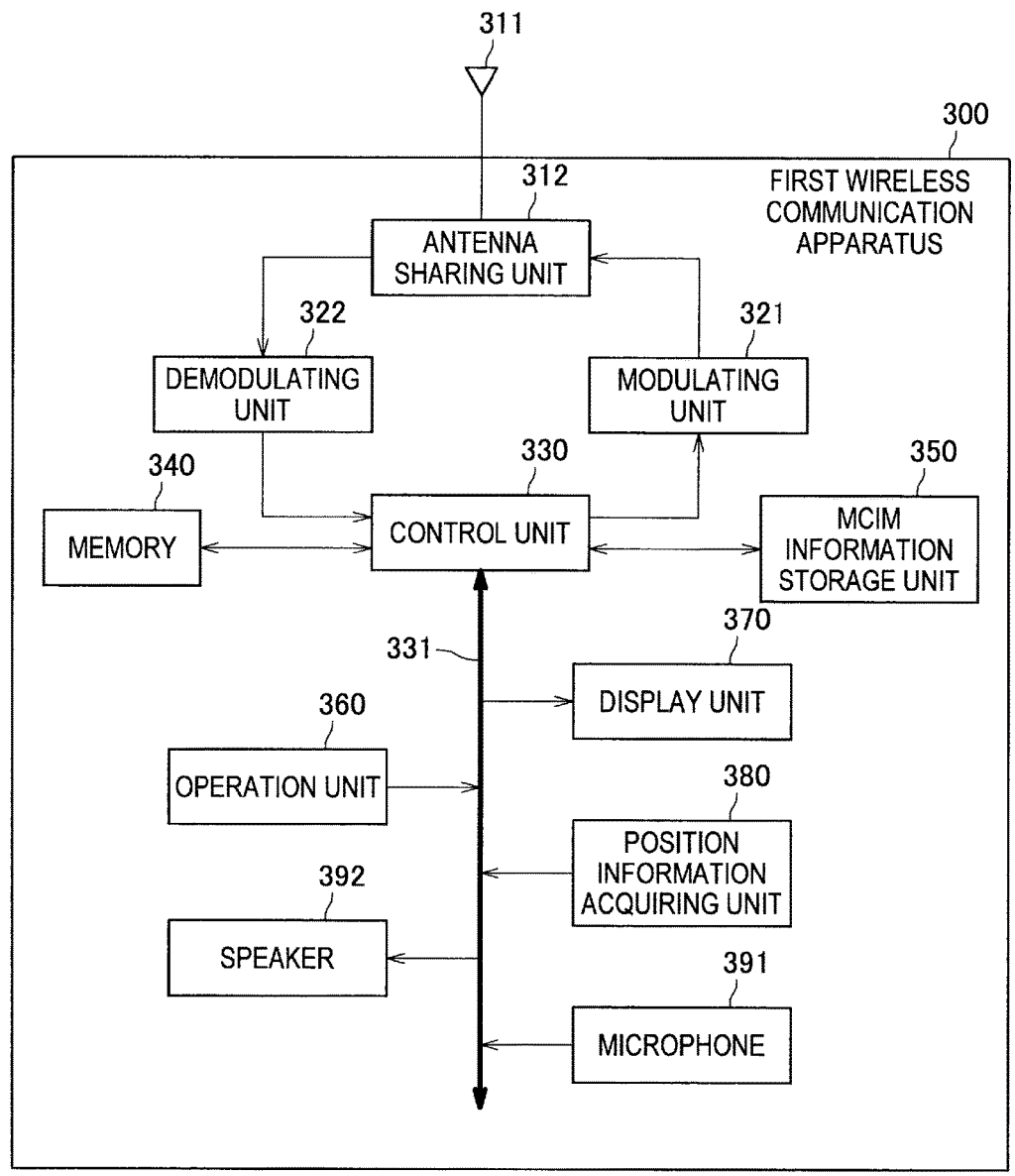

[Fig. 5]
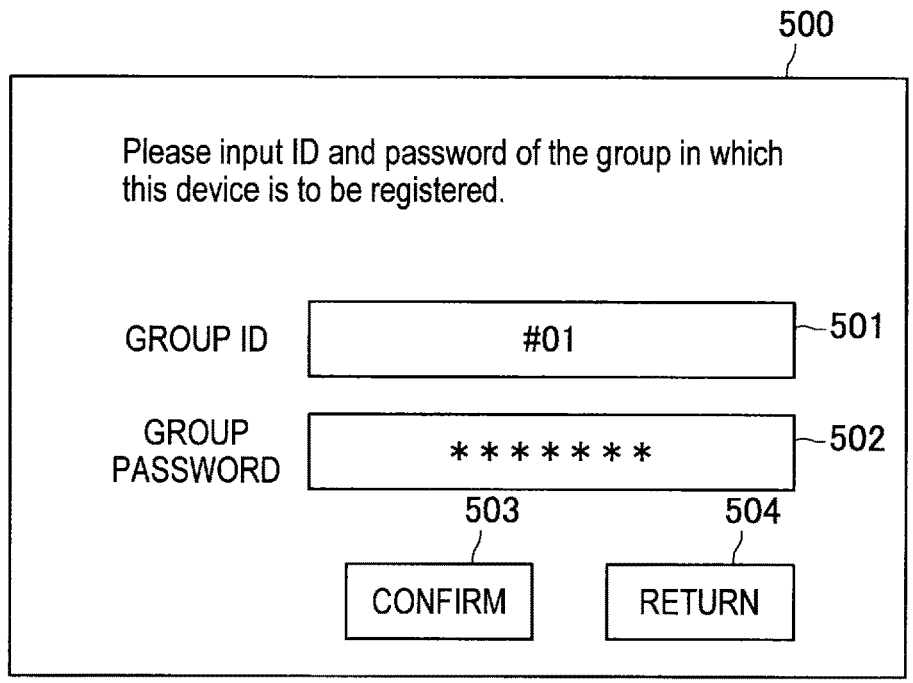
[Fig. 6]
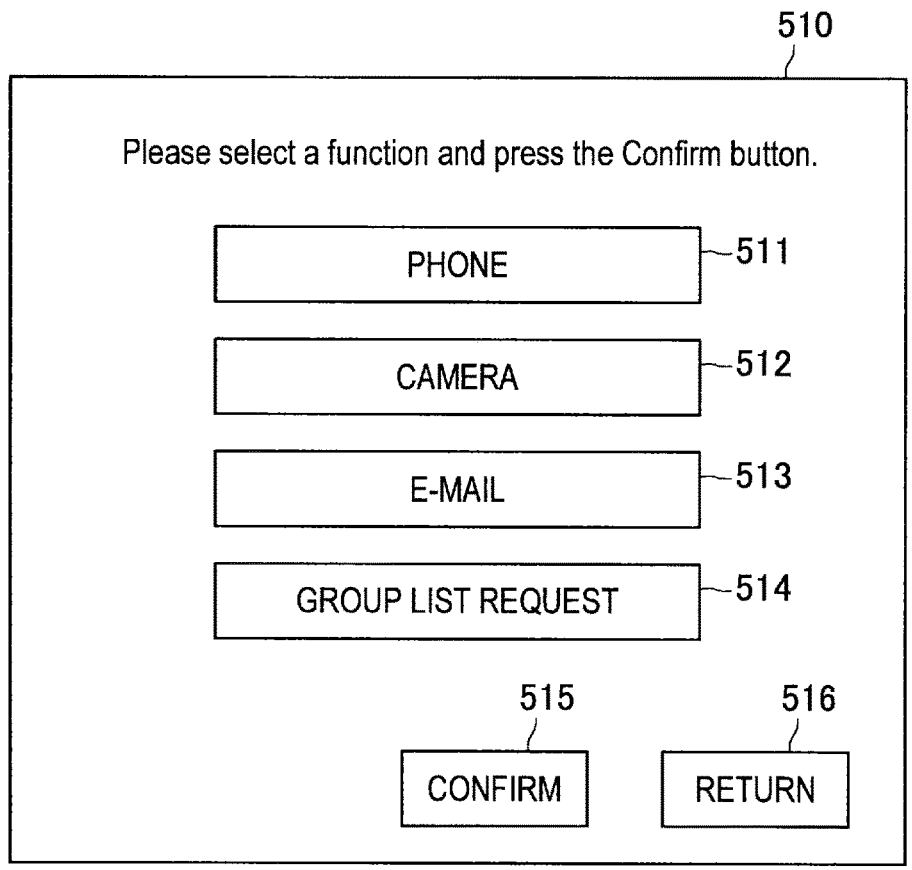

[Fig. 7]
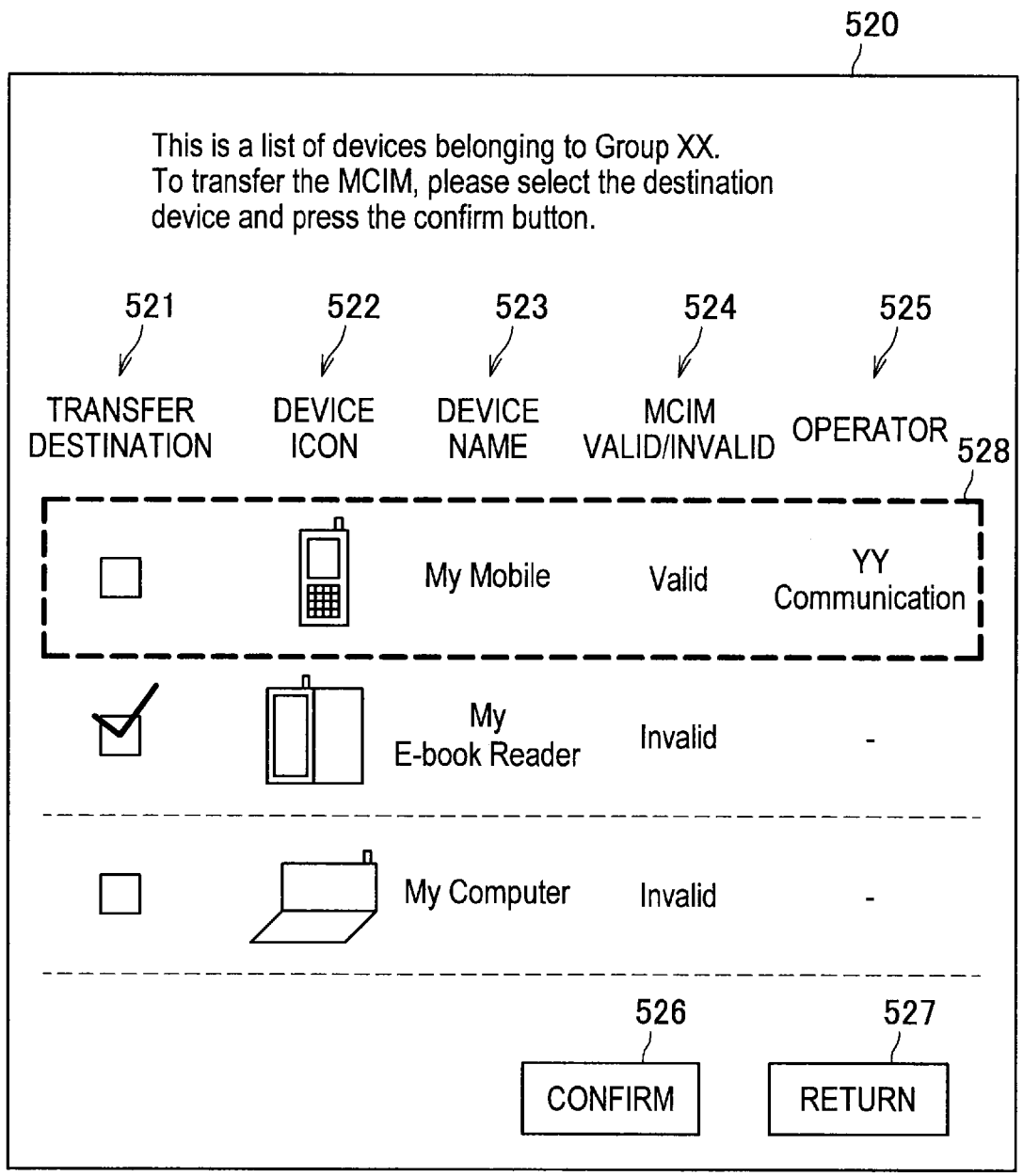

[Fig. 8]
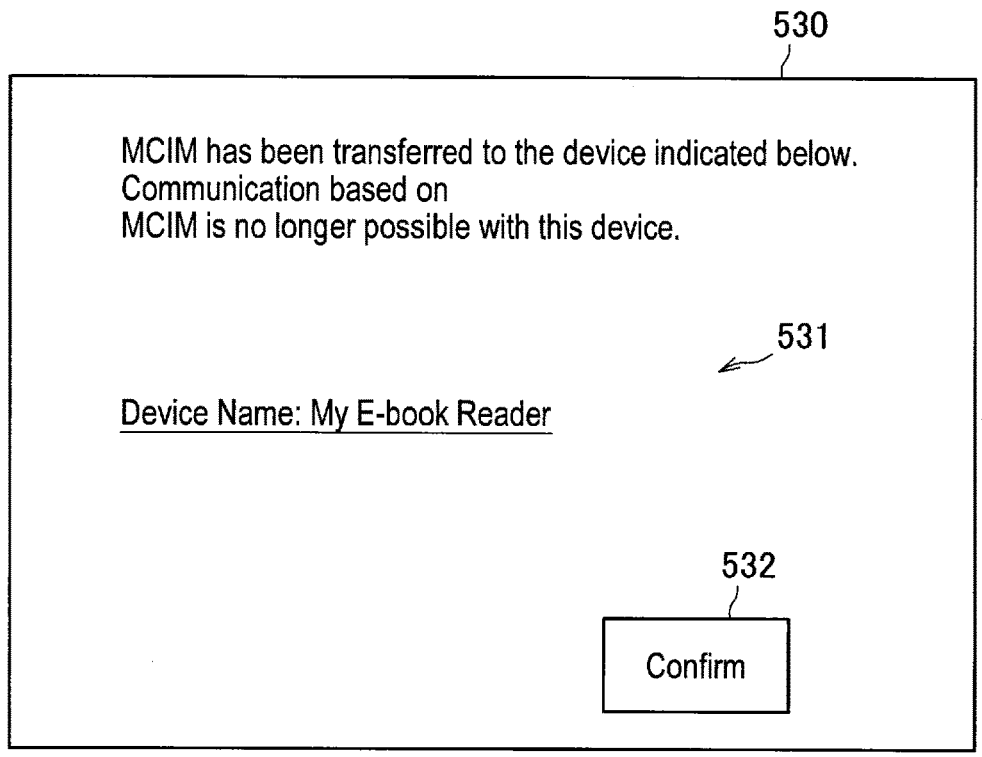
(a)
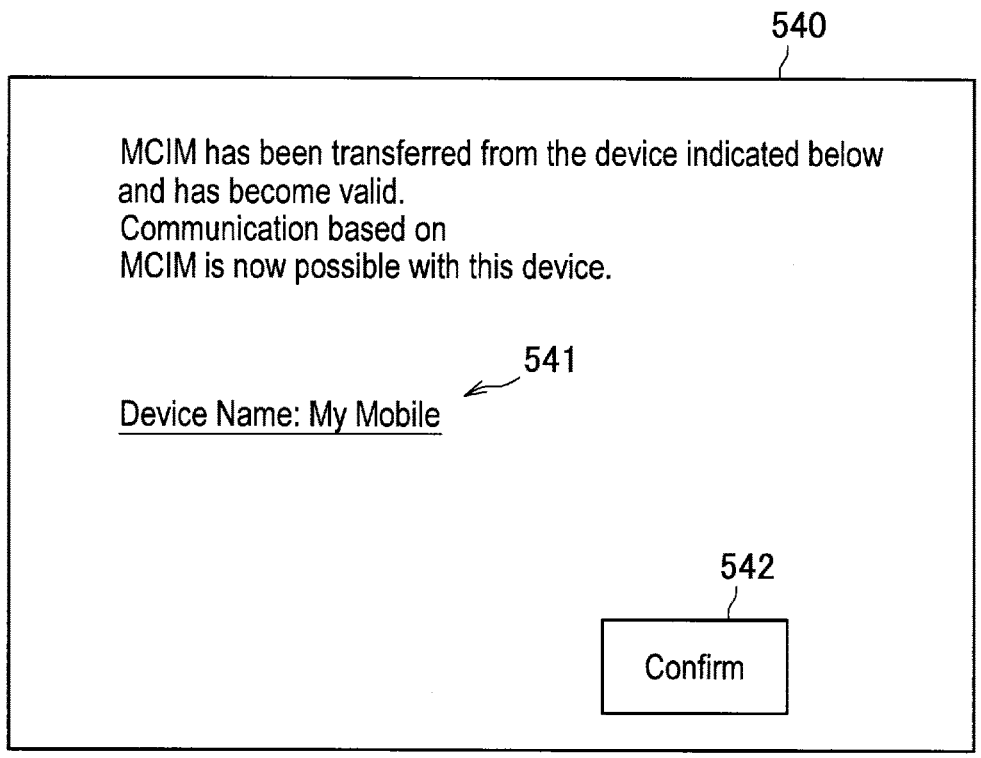
(b)

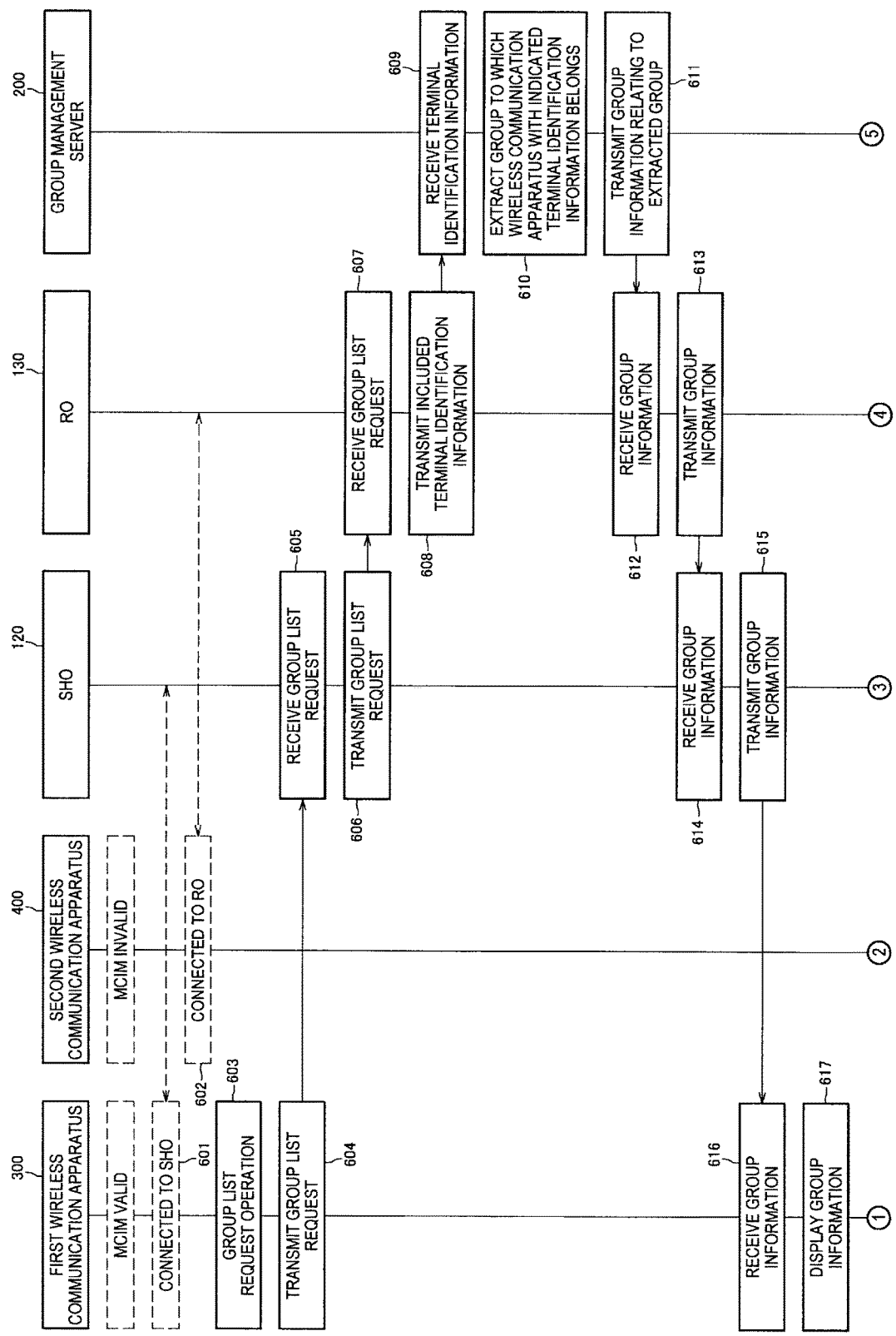
[Fig. 9]

[Fig. 10]
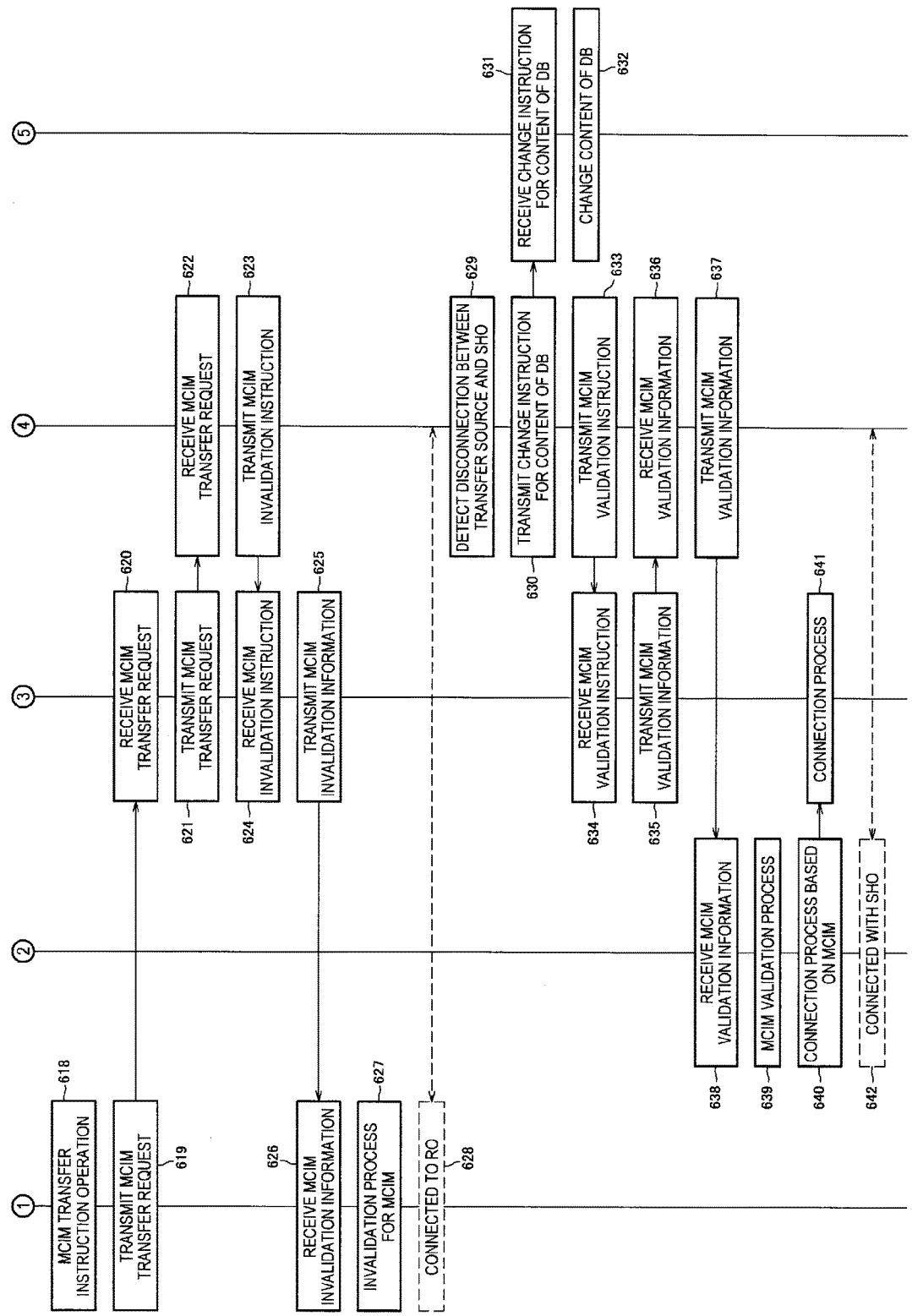

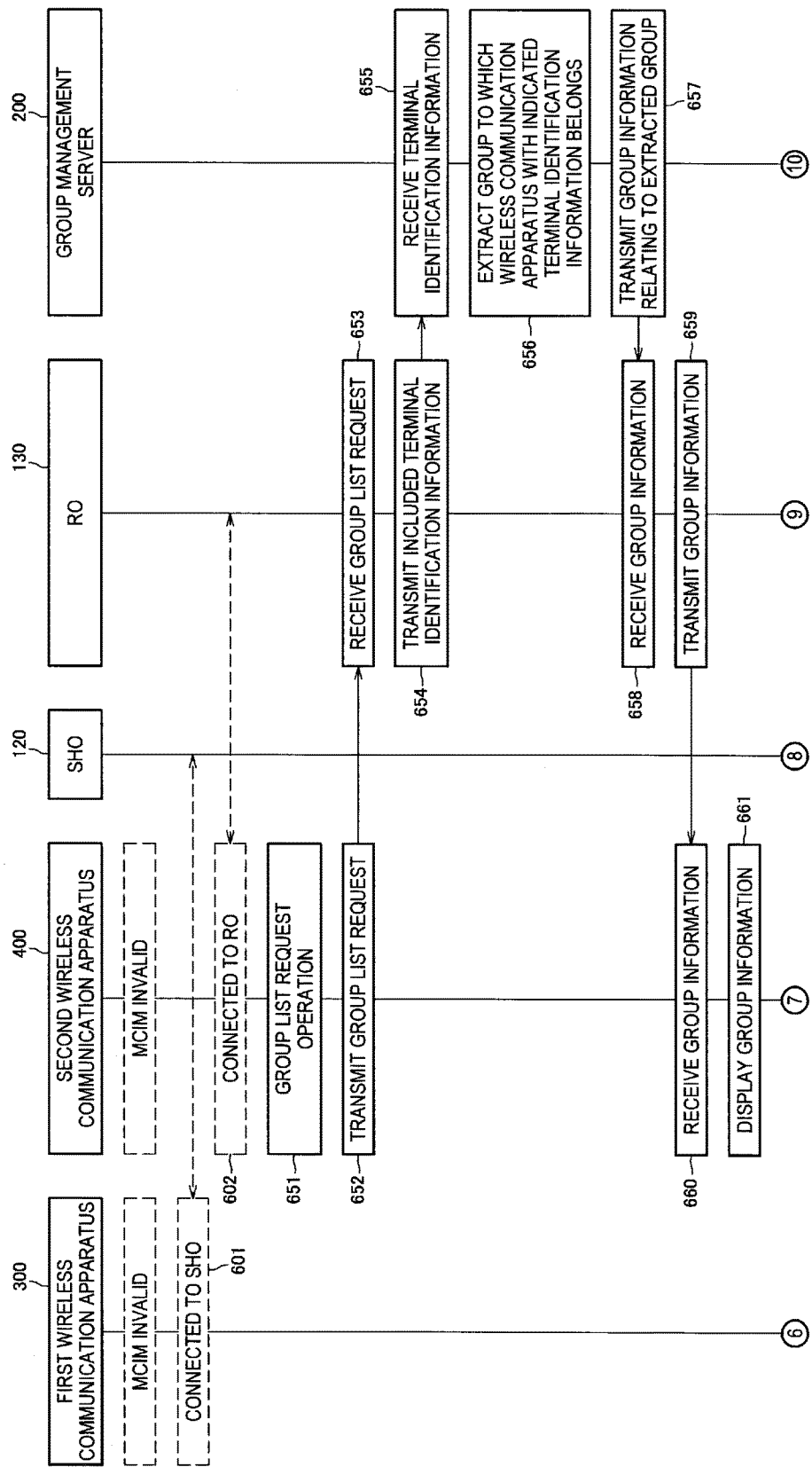
[Fig. 11]

[Fig. 12]
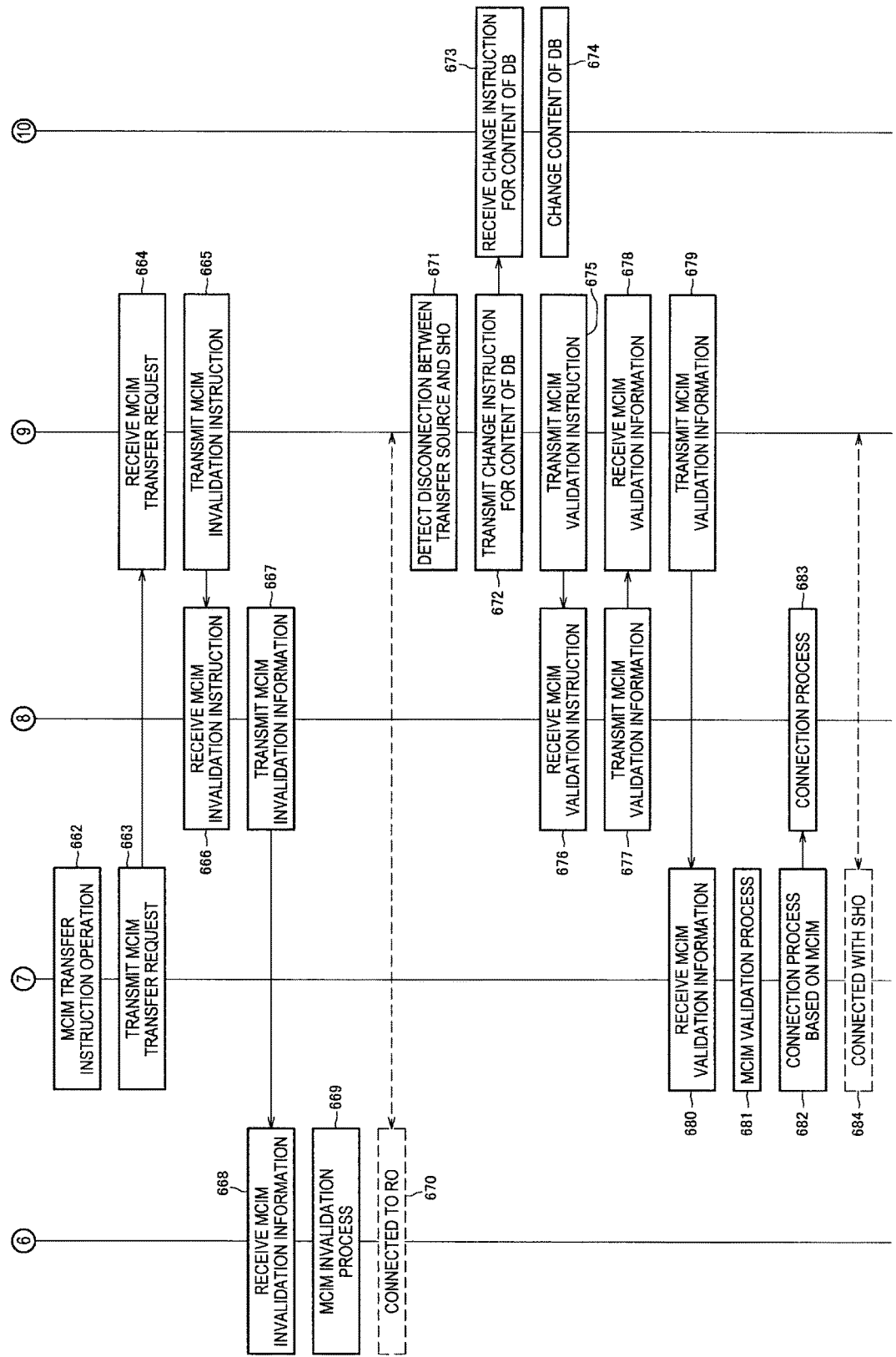

[Fig. 13]
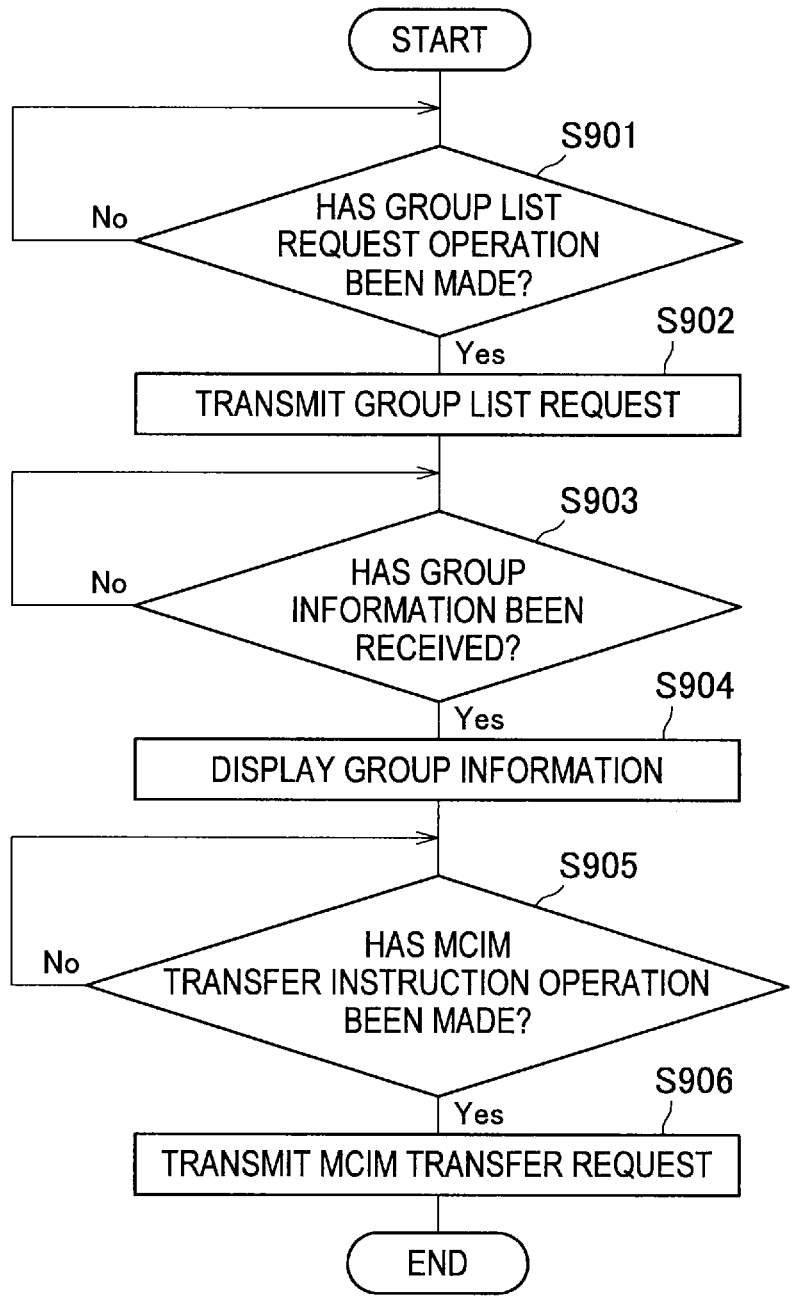

[Fig. 14]
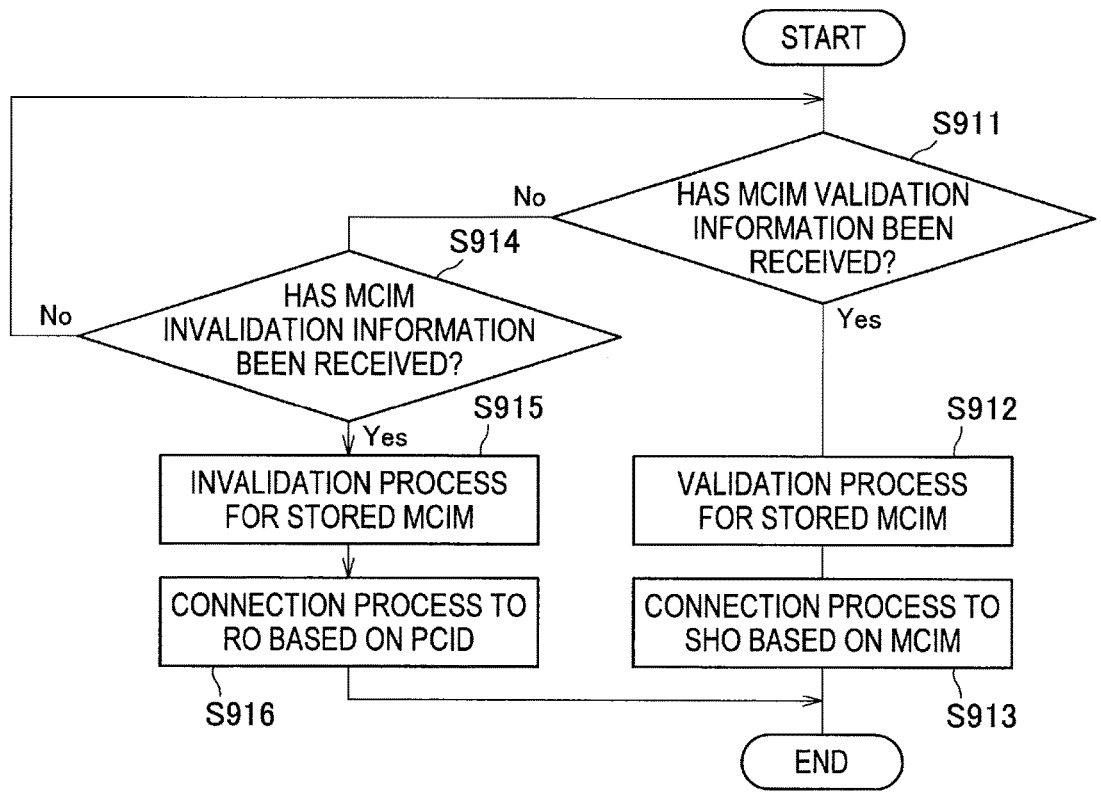

[Fig. 15]
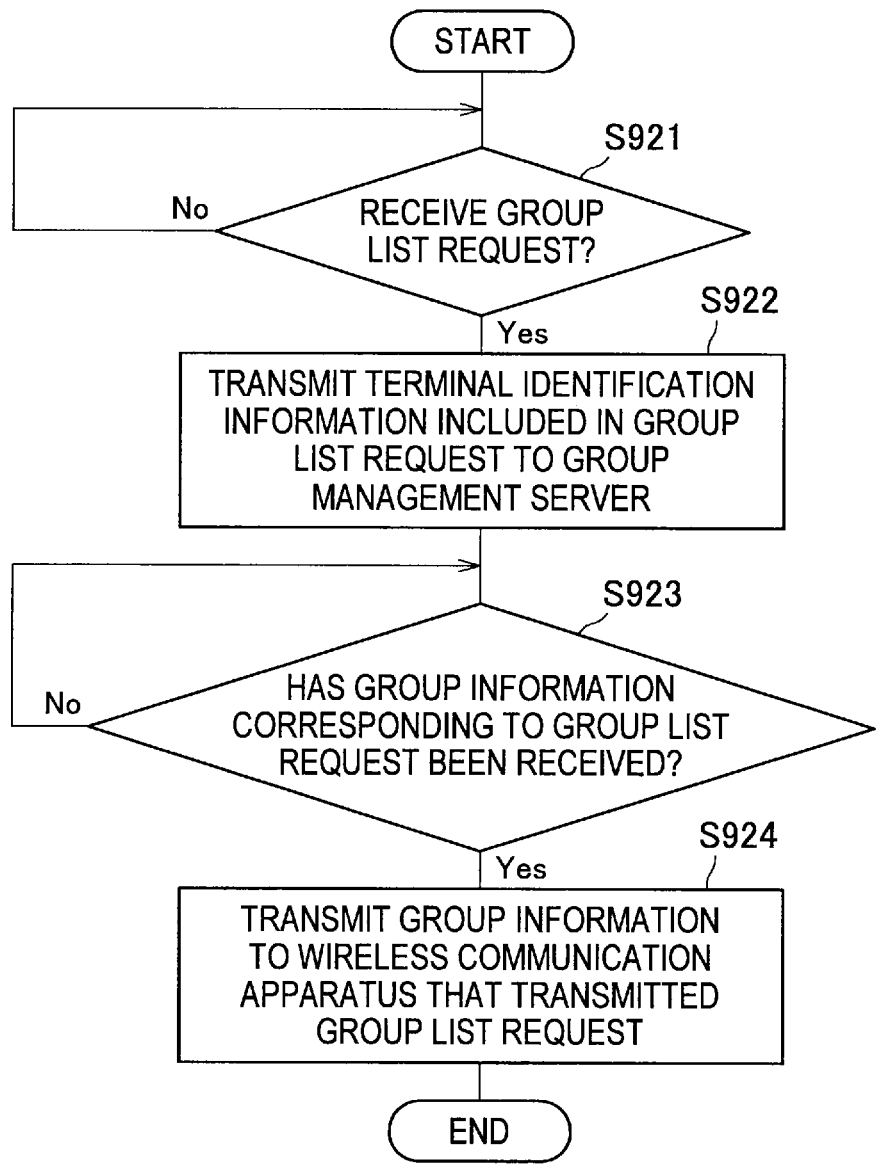

[Fig. 16]
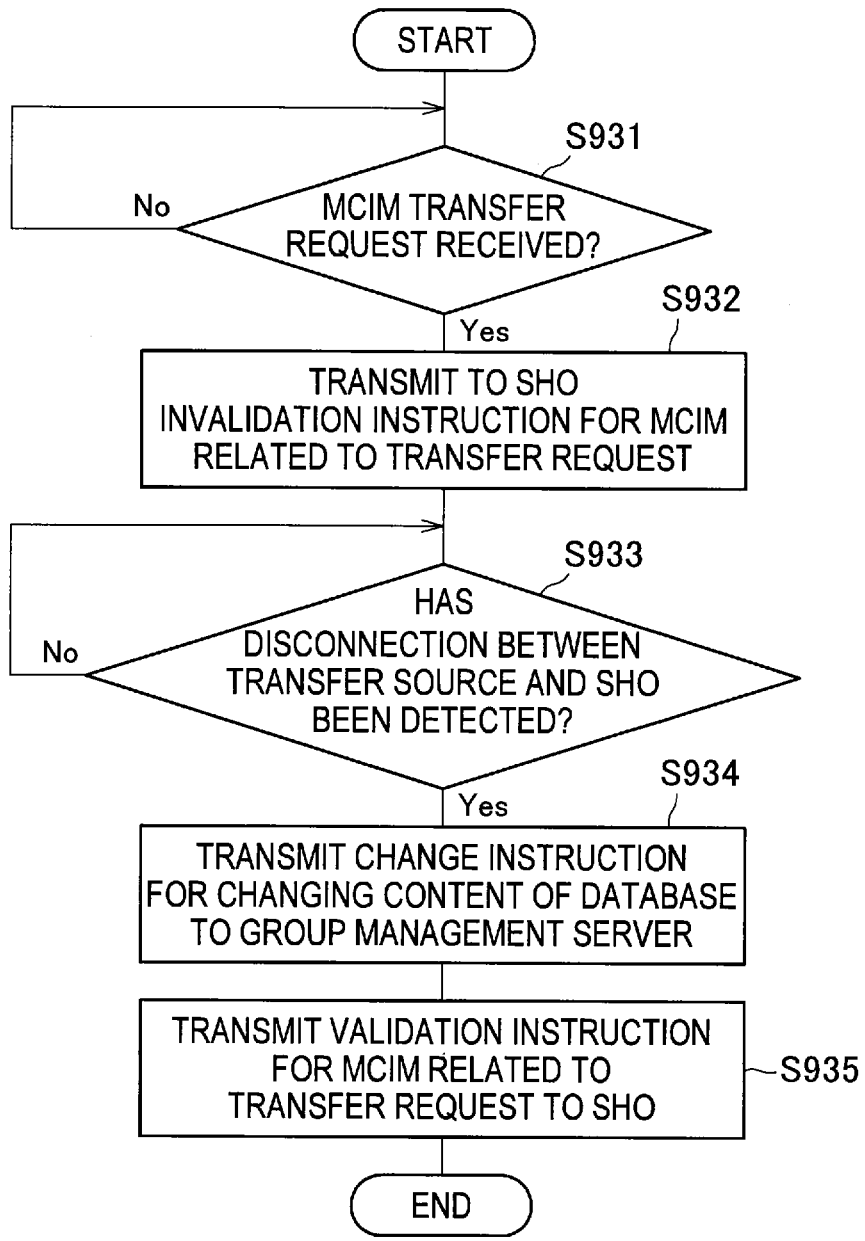

[Fig. 17]
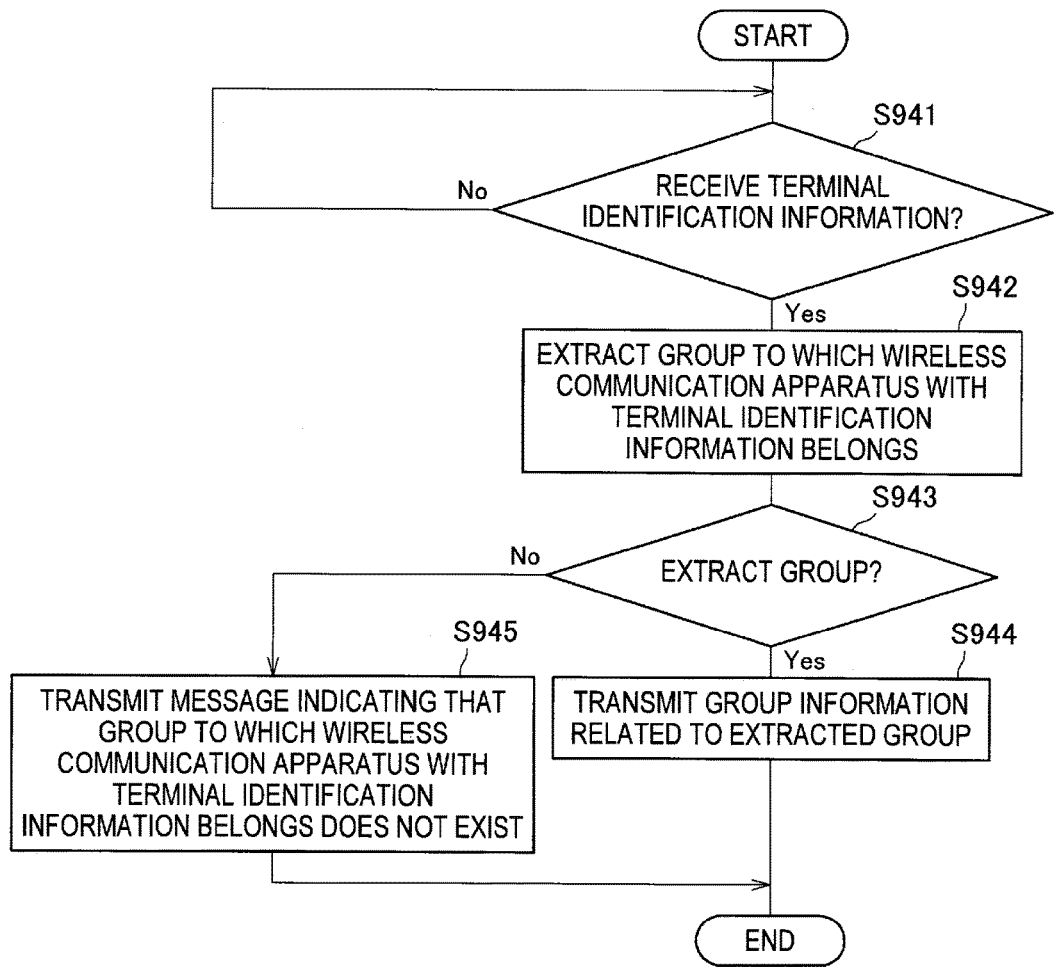

INFORMATION PROCESSING APPARATUS, NETWORK CONTROL APPARATUS, WIRELESS COMMUNICATION APPARATUS, COMMUNICATION SYSTEM, AND INFORMATION PROCESSING METHOD

TECHNICAL FIELD

CROSS-REFERENCE TO RELATED APPLICATIONS

This application is based upon and claims the benefit of priority from Japanese Patent Application JP 2011-098979, filed on Apr. 27, 2011, the entire contents of which are hereby incorporated by reference.

The present disclosure relates to an information processing apparatus, a communications device, a communications system, and corresponding methods for securely associating communications devices with groups of device having a corresponding connection right.

BACKGROUND ART

An expanded functionality is being considered for the 3rd Generation Partnership Project (i.e., 3GPP) that decides the technical specification of public wireless communication networks (see for example, 3GPP TR 33.812 V9.2.0 (2010-06)).

Using such an expanded functionality, known as "Machine to Machine Equipment," it will become possible to flexibly use information showing what services can be utilized. Such information may be referred to as a Machine Communication Identity Module (MCIM), which is one example of contact authentication information. As an example, a system may download an MCIM from a network.

SUMMARY

Technical Problem

By using the expanded functionality described above, it is possible to conceive new methods of using an MCIM that differ from those used in the past. For example, it is conceivable to download the content of information only without removing an Universal Integrated Circuit Card (UICC). Such exemplary processes may save time previously spent removing the UICC. Thus, the expanded functionality of the disclosed exemplary embodiments facilitates the use of a plurality of wireless communication apparatus by one or more users.

Exemplary embodiments of the present disclosure were conceived in view of the above and aim to facilitate the use of a right to connect to a network between a plurality of wireless communication apparatuses.

Solution to Problem

Consistent with an exemplary embodiment, an information processing apparatus includes a receiving unit configured to receive, from a first communications device, a request for information identifying at least one second communications device. The second communications device is associated with the first communications device, and the first and second communications devices share at least one connection right. The information processing apparatus also includes a control unit configured to obtain the information, based on the received request, and generate an instruction to transmit the information to the first communications device.

Consistent with a further exemplary embodiment, a computer-implemented method receives, from a first communications device, a request for information identifying at least one second communications device. The second communications device is associated with the first communications device, and the first and second communications devices share at least one connection right. Information is obtained, based on the received request, and at least one processor generates an instruction to transmit the information to the first communications device.

Consistent with another exemplary embodiment, a tangible, non-transitory computer-readable medium stores instructions that, when executed by at least one processor, cause the processor to perform a method that includes receiving, from a first communications device, a request for information identifying at least one second communications device. The second communications device is associated with the first communications device, and the first and second communications devices share at least one connection right. Information is obtained, based on the received request, and at least one processor generates an instruction to transmit the information to the first communications device.

Consistent with yet another exemplary embodiment, a communications device includes a transmission control unit configured to generate a first instruction to transmit a request for information identifying at least one additional communications device. The additional communications device is associated with and shares at least one connection right with the communications device. The communications device also includes a display control unit configured to generate a second instruction to display information associated with an outcome of the request.

Consistent with an additional exemplary embodiment, a communications system includes a terminal device comprising a transmission control unit configured to generate an instruction to transmit a request for information identifying at least one additional communications device. The additional communications device is associated with the terminal device and shares at least one connection right with the terminal device. The communications system also includes an information processing apparatus in communications with the terminal device. The information processing apparatus includes a receiving unit configured to receive the request from the terminal device, and a control unit configured to obtain the information, based on the received request, and generate an instruction to transmit the information to the terminal device.

Advantageous Effects of Invention

According to the disclsoed exemplary embodiments, a notable effect whereby the right to connect to a network is easier to be used between a plurality of wireless communication apparatuses is achieved.

BRIEF DESCRIPTION OF DRAWINGS

FIGS. 1(a) and 1(b) illustrate configurations of a communications network that includes a plurality of wireless communication apparatuses, according to a first exemplary embodiment;

FIG. 2 illustrates an exemplary configuration of a communication system, according to the first exemplary embodiment;

FIGS. 3(a) and 3(b) are schematic diagrams of data stored within databases of a storage unit, according to the first exemplary embodiment;

FIG. 4 is a block diagram showing an example of an internal configuration of a first wireless communication apparatus, according to the first exemplary embodiment;

FIG. 5 is a diagram of a screen displayed by a display unit of a first wireless communication apparatus, according to the first exemplary embodiment;

FIG. 6 is a diagram of a screen displayed by a display unit of a first wireless communication apparatus, according to the first exemplary embodiment;

FIG. 7 is a diagram of a screen displayed by a display unit of a first wireless communication apparatus, according to the first exemplary embodiment;

FIGS. 8(a) and 8(b) are diagrams of a screen displayed by a display unit of a first wireless communication apparatus, according to the first exemplary embodiment;

FIG. 9 is a flowchart of a communication process performed by communications devices of a communication system, according to the first exemplary embodiment;

FIG. 10 is a flowchart of a communication process performed by communications devices of a communication system, according to the first exemplary embodiment;

FIG. 11 is a flowchart of a communication process performed by communications devices of a communication system, according to the first exemplary embodiment;

FIG. 12 is a flowchart of a communication process performed by communications devices of a communication system, according to the first exemplary embodiment;

FIG. 13 is a flowchart of a communication process performed by communications devices of a communication system, according to the first exemplary embodiment;

FIG. 14 is a flowchart of an MCIM validation/invalidation process performed by a first wireless communication apparatus, according to the first exemplary embodiment;

FIG. 15 is a flowchart of a communication process performed by a registration operator (RO), according to the first exemplary embodiment;

FIG. 16 is a flowchart of a MCIM validation/invalidation instruction process performed by a registration operator (RO), according to the first exemplary embodiment; and FIG. 17 is a flowchart of a group information transmission process performed by a group management server, according to the first exemplary embodiment.

DESCRIPTION OF EMBODIMENTS

Hereinafter, exemplary embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. The exemplary embodiments of the present disclosure will now be described in the order stated below.

1. First Exemplary Embodiment (Group Information Transmission Control: Example of Transmission of Group Information to a Wireless Communication Apparatus Composing a Group Sharing an MCIM); and 2. Modifications 1. First Embodiment a. Example Usage of Wireless Communication Apparatuses FIGS. 1(a) and 1(b) are diagrams illustrating configurations of a communications network that includes a plurality of wireless communication apparatuses, according to a first exemplary embodiment. That is, FIG. 1(b) shows an example where a single user 10 uses a plurality of wireless communication apparatuses (namely, a first wireless communication apparatus 300, a second wireless communication apparatus 400, and a third wireless communication apparatus 410).

As examples, the first wireless communication apparatus 300 is a mobile telephone apparatus (for example, a "smartphone") and the second wireless communication apparatus 400 is an electronic book display apparatus equipped with a wireless communication function. As one example, the third wireless communication apparatus 410 is an information processing apparatus (for example, a notebook personal computer) equipped with a wireless communication function.

Here, as described earlier, expanded functionality is being considered for the 3GPP. For this reason, it may be important to utilize such expanded functionality in order to facilitate the use of a plurality of wireless communication apparatuses by the same user or users.

One example of such expanded functionality is having one MCIM (Machine Communication Identity Module) limited to one terminal (a wireless communication apparatus or the like). For this reason, in the first exemplary embodiment, an example is described where contract authentication information (for example, an MCIM) is shared by a plurality of wireless communication apparatuses using the MCIM specification in 3GPP TR33.812. Consistent with the disclosed exemplary embodiments, FIG. 1(a) illustrates an example of a network configuration composed of an SHO (Selected Home Operator) 120 and an RO (Registration Operator) 130 is shown (see, for example, 3GPP TR 33.812 V9.2.0 (2010-06)).

The SHO 120 provides Internet services and the like and, as one example, corresponds to a communication provider (for example, a mobile telephone provider) that provides a wireless connection service. The RO 130 also provides services such as initial connection and registration and, as one example, corresponds to a communication provider (for example, a mobile telephone provider) that provides a wireless connection service. The SHO 120 and the RO 130 are also connected and are capable of communicating with one another.

Note that SHO 120 and RO 130 represent logical roles and although a case where such devices are operated by different businesses is imagined, it would also be possible for the same business to operate both devices. It is also possible for multiple SHO 120 and RO 130 to be present. Also, SHO 120 and RO 130 may be configured as a single information processing apparatus or may be constructed of a plurality of apparatuses. Here, SHO 120 and RO 130 refer to relative roles with respect to a particular wireless communication apparatus in possession of a valid MCIM. This means that it is possible for a device that corresponds to an RO for one wireless communication apparatus to correspond to a SHO for a different wireless communication apparatus.

Here, an MCIM is one example of contract authentication information and such contract authentication information is information including telephone subscriber information and authentication key information. As one example, an MCIM is contract authentication information (a so-called "software downloadable SIM (Subscriber Identity Module)") that is not limited to a specified communication provider (for example, a mobile telephone provider) when a device is purchased and can be flexibly set by a communication provider after purchase. Also, as examples, the expression "when a valid MCIM is not stored" refers to when an MCIM itself is not stored or when only MCIM that have been invalidated by an MCIM invalidation process are stored.

That is, the first wireless communication apparatus 300, the second wireless communication apparatus 400, and the third wireless communication apparatus 410 are capable of connecting via the base stations 121 and 122 to the SHO 120 only when a valid MCIM is stored. In such case, as one example, the wireless communication apparatus that stores the valid MCIM is capable of connecting via the base stations 121 and 122 to the SHO 120 based on an IMSI (International Mobile Subscriber Identity). On the other hand, a wireless communication apparatus that does not store a valid MCIM is capable of connecting via base stations 131 and 132 to the RO 130 based on a PCID (Provisional Connectivity Identity). When a wireless communication apparatus that does not store a valid MCIM connects to the RO 130, it is possible to connect via the base stations 121 and 122 and the SHO 120 to the RO 130.

Here, the PCID is an identifier (for example, terminal identification information (terminal identification information on a network) 252 shown in FIG. 3(b)) for connecting to the RO, and is assigned to every wireless communication apparatus and device.

For example, when a wireless communication apparatus storing a valid MCIM is a mobile telephone apparatus, such wireless communication apparatus will be in a state where the wireless communication apparatus is connected to the SHO 120 (that is, where the wireless communication apparatus can be used as a mobile telephone). Meanwhile when a wireless communication apparatus not storing a valid MCIM is a mobile telephone apparatus, such mobile communication apparatus will be in a state where the wireless communication apparatus is connected to the RO 130 (that is, not a state where the wireless communication apparatus is capable of being used as a mobile telephone, but rather is capable of moving to such state).

In this way, since all of the wireless communication apparatuses store contract authentication information (referred to, for example, as "first contract authentication information") for connecting to the RO 130, all of such apparatuses are capable of connecting to the RO 130. Meanwhile, a wireless communication apparatus that stores contract authentication information (referred to for example as "second contract authentication information" (for example, an MCIM)) for connecting to the SHO 120 is capable of connecting to the SHO 120 and is also capable of connecting to the public network 110 (for example, a public network such as a telephone network or the Internet).

Also, if use rights over the MCIM are shared between a plurality of wireless communication apparatuses, it is possible to set the plurality of wireless communication apparatuses related to such sharing as a single group. Such group will be described in detail with reference to drawings such as FIG. 3.

b. Example Configuration of Communication System

FIG. 2 is a block diagram showing an example of the system configuration of the communication system 100 according to the first exemplary embodiment. Note that in the first exemplary embodiment, an example of the system configuration from the viewpoint of a wireless communication apparatus storing a valid MCIM for a communication provider who operates the SHO 120 is shown. In FIG. 2, parts that are the same as in FIG. 1 are assigned the same reference numerals.

The communication system 100 includes a public network 110, base stations 121, 122, 131, and 132, the SHO 120, the RO 130, a group management server 200, the first wireless communication apparatus 300, the second wireless communication apparatus 400, and the third wireless communication apparatus 410.

The public network 110 is a public network such as a telephone network or the Internet. The public network 110 and the SHO 120 are connected via a gateway (not shown). In the same way, the public network 110 and the RO 130 are connected via a gateway (not shown).

The SHO 120 is an information processing apparatus (e.g., a communication control apparatus or a network control apparatus) managed by a communication provider that provides a wireless connection service and includes an authentication control unit (not shown). This authentication control unit carries out authentication control of wireless communication apparatuses connected via the base stations 121 and 122 (for example, an authentication control unit). Here, aside from special cases, the authentication control unit of the SHO 120 authenticates a wireless communication apparatus storing a valid MCIM (contract authentication information) out of the wireless communication apparatuses connected via the base stations 121 and 122. The SHO 120 also connects the authenticated wireless communication apparatus via the gateway (not shown) to the public network 110.

The SHO 120 is also connected to the RO 130 so as to exchange various information with the RO 130. Here, a wireless communication apparatus that does not store a valid MCIM is capable of connecting (with a limited connection) via the SHO 120 to the RO 130 based on the PCID of the wireless communication apparatus.

The base stations 121 and 122 are mobile communication base stations (NodeB) that connect the first wireless communication apparatus 300, the second wireless communication apparatus 400, and the third wireless communication apparatus 410, to the SHO 120 via wireless connections 141, or the like.

The RO 130 is a communication control apparatus (network control apparatus) managed by the communication provider who provides services such as initial connection and registration and includes a control unit 135. The control unit 135 corresponds to the control unit of the SHO 120. Note that the RO 130 is one example of the "RO" and the "network control apparatus" referred to in the patent claims.

The base stations 131 and 132 are mobile communication base stations (NodeB) that connect the first wireless communication apparatus 300, the second wireless communication apparatus 400, and the third wireless communication apparatus 410 to the RO 130 via wireless connections 143 and the like.

For example, in the communication system 100, the wireless communication apparatus storing a valid MCIM of a communication provider that operates the SHO 120 is capable of connecting (with a normal connection) to the SHO 120 via the base stations 121 and 122 based on the MCIM. Also, in the communication system 100, the respective wireless communication apparatuses that do not store a valid MCIM are capable of connecting (with a limited connection) via the base stations 131, 132 to the RO 130 based on the PCID of each wireless communication apparatus. Note that the respective wireless communication apparatuses that do not store a valid MCIM are also capable of connecting (with a limited connection) via the SHO 120 to the RO 130. Also, the first wireless communication apparatus 300, the second wireless communication apparatus 400, and the third wireless communication apparatus 410 are each capable of connecting to any of the base stations 121, 122, 131, and 132 in accordance with the location at which such apparatuses are used.

A group management server 200 is a server (e.g., information processing apparatus) that manages a group composed of a plurality of wireless communication apparatuses that share an MCIM and includes a communication unit 210, the control unit 220, and a storage unit 230. Note that the group management server 200 is one example of an "information processing apparatus" referred to in the patent claims.

The communication unit 210 transmits and receives various information based on control by the control unit 220. The communication unit 210 is connected for example to the RO 130 and transmits and receives various information to and from the respective wireless communication apparatuses connected via the RO 130.

For example, the control unit 135 of the RO 130 receives a group list request (acquisition information) for acquiring group information stored in the storage unit 230 from a wireless communication apparatus. Such group information is information relating to the respective wireless communication apparatuses belonging to a group and as one example is the various information shown in FIG. 3(b). The group information is for example information for displaying a list of the respective wireless communication apparatuses that belong to a group on a wireless communication apparatus (for example, the information included in a group list display screen 520 shown in FIG. 7). That is, the group information is information for specifying that the plurality of wireless communication apparatuses are the same group and is information for sharing the same MCIM between the respective wireless communication apparatuses that compose the group.

In this way, when a group list request has been received, the control unit 135 requests the group information from the group management server 200. That is, the control unit 135 transmits the terminal identification information (acquisition information) included in the group list request to the group management server 200.

The communication unit 210 receives the terminal identification information transmitted by the control unit 135. In this way, as one example the acquisition information is the terminal identification information included in the group list request transmitted from a wireless communication apparatus (for example, the terminal identification information 252 shown in FIG. 3(b)). After this, the communication unit 210 outputs the various information received from a wireless communication apparatus or the like to the control unit 220. Here, the RO 130 receives a group list request from a wireless communication apparatus storing a valid MCIM via the SHO 120. The RO 130 also receives a group addition request from a wireless communication apparatus that does not store a valid MCIM directly without passing via the SHO 120.

In response to the group list request, the communication unit 210 transmits the group information outputted from the control unit 220 to the RO 130. The control unit 135 of the RO 130 carries out control that transmits the group information outputted from the communication unit 210 in response to a group list request via a wireless connection to the wireless communication apparatus that transmitted the group list request. Note that the communication unit 210 is one example of a "receiving unit" referred to in the patent claims.

The control unit 220 carries out control over the various components of the group management server 200. As one example, when the communication unit 210 has received terminal identification information (acquisition information) from the RO 130, the control unit 220 transmits the group information relating to such terminal identification information to the RO 130. More specifically, the control unit 220 uses the received terminal identification information to extract the group to which the wireless communication apparatus that transmitted the terminal identification information belongs from a database (shown in FIG. 3) stored in the storage unit 230. The control unit 220 then transmits the group information related to the extracted group to the RO 130.

Also, when receiving a group addition request from the wireless communication apparatus via the communication unit 210, the control unit 220 controls additionally registering of a new wireless communication apparatus in the group based on the group addition request.

The group described above can be understood as a group that shares network connection rights. Such network connection rights are the right to connect to a specified network (for example, the public network 110) via a wireless connection and as one example correspond to use rights over an MCIM. That is, the network connection rights are rights for connecting to base stations operated by a communication provider based on an MCIM for connecting to the SHO 120 via such base stations. For example, the presence or absence of such network connection rights can be decided according to the presence or absence of use rights over an MCIM.

The storage unit 230 is a storage unit for storing a database for managing groups which are each composed of a plurality of wireless communication apparatuses sharing an MCIM. Note that each of databases stored by the storage 230 will be described in detail with reference to FIGS. 3(a) and 3(b).

Here, an example will be described where use rights over the MCIM are transferred (i.e., where the network connection rights are transferred) in the communication system 100. For example, the MCIM is stored in advance in the respective wireless communication apparatuses. Based on an instruction from the RO 130, the SHO 120 is capable of transferring the use rights over the MCIM by validating or invalidating the MCIM of the respective wireless communication apparatuses.

Instead of storing the MCIM in the respective wireless communication apparatuses, it is also possible to transfer use rights over the MCIM by transferring the MCIM itself. As one example, a case where use rights over the MCIM are transferred from the first wireless communication apparatus 300 to the second wireless communication apparatus 400 is imagined. For example, an MCIM transfer request is transmitted from the first wireless communication apparatus 300 to the RO 130 via the SHO 120. In this case, based on an instruction from the RO 130, the MCIM stored in the first wireless communication apparatus 300 is invalidated (deleted) by the SHO 120. In addition, transfer information (setting information including the MCIM) is transmitted via the RO 130 from the SHO 120 to the second wireless communication apparatus 400. By storing the MCIM included in the transfer information in the second wireless communication apparatus 400, a valid MCIM is set in the second wireless communication apparatus 400.

c. Exemplary Storage Units

FIGS. 3(a) and 3(b) are diagrams schematically showing databases stored in the storage unit 230 according to the first exemplary embodiment. FIG. 3(a) shows a group management database 240 stored in the storage unit 230 and FIG. 3(b) shows a terminal management database 250 stored in the storage unit 230.

A group ID 241, a group password 242, and a group name 243 are stored so as to be associated in group units in the group management database 240. As one example, such information is successively updated by the control unit 220 based on various requests (group generation requests, group deletion requests) from the respective wireless communication apparatuses.

An ID assigned to a group is stored in the group ID 241. Similarly, a password assigned to a group is stored in the group password 242. Such ID and password of a group are used when additionally registering a new wireless communication apparatus in the group. For this reason, the respective wireless communication apparatuses that belong to a group are capable of storing the ID and password assigned to the group (for example, storage in a memory 340 shown in FIG. 4). It is also possible to use an arrangement where the ID and password are inputted every time by the user without being stored in the wireless communication apparatus.

A name assigned to a group is stored in the group name 243. This name is stored for example when the group is generated.

Various information relating to wireless communication apparatuses (devices) is stored in group units in association with a group ID 251 in the terminal management database 250. That is, a group ID 251, terminal identification information 252, valid/invalid information 254, an operator 255, a device type 256, a device name 257, and icon information 258 are stored in the terminal management database 250. An MSISDN (Mobile Subscriber Integrated Services Digital Network Number) 253 is also stored in the terminal management database 250. As one example, such information is successively updated by the control unit 220 based on requests (group addition requests, group deletion requests) from the respective wireless communication apparatuses.

The ID assigned to a group is stored in the group ID 251. This ID corresponds to the group ID 241 shown in FIG. 3(*a*).

Terminal identification numbers of wireless communication apparatuses (devices) are stored in the terminal identification information 252. The terminal identification information is identification information for identifying a wireless communication apparatus, and as examples a PCID, an IMEI (International Mobile Equipment Identity), or the like is stored. Note that in FIG. 3(*b*) for ease of explanation, the terminal identification information is simplified to a six-digit number. For example, in FIG. 3(*b*), the terminal identification information 252 "124567" is assumed to correspond to the first wireless communication apparatus 300. In the same way, the terminal identification information 252 "311111" is assumed to correspond to the second wireless communication apparatus 400, and the terminal identification information 252 "123222" is assumed to correspond to the third wireless communication apparatus 410.

Information showing the telephone number set for a wireless communication apparatus is stored in the MSISDN 253. Here, when an MCIM is shared by a plurality of wireless communication apparatuses, the telephone number set for such wireless communication apparatuses is normally the same. However, it is also possible for different telephone numbers to be set for each of the plurality of wireless communication apparatuses that share an MCIM. Note that in FIG. 3(*b*), for ease of explanation, a case where the same telephone number is set in each wireless communication apparatus is shown and the information is simplified by showing only the digits (or code) showing such telephone number.

Information showing whether the MCIM at the wireless communication apparatus is valid or invalid (or that an MCIM is yet to be stored) is stored in the valid/invalid information 254. That is, information showing whether network connection rights are present or absent at the wireless communication apparatus is stored in the valid/invalid information 254. Note that in FIG. 3(*b*), for ease of explanation, a wireless communication apparatus where the MCIM is valid is shown as "valid" and a wireless communication apparatus where the MCIM is invalid is shown as "invalid".

Information relating to the communication provider (or "operator") relating to the MCIM set in the wireless communication apparatus is stored in the operator 255. Note that in FIG. 3(*b*), for ease of explanation, the information is simplified by showing only a name ("YY Communication", "ZZ Wireless") showing the communication provider.

Information relating to the device type of the wireless communication apparatus (device) is stored in the device type 256. Note that in FIG. 3(*b*), for ease of explanation, the information is simplified by showing only a name (mobile phone xyz1, e-book reader abc, or the like) showing the device type of the wireless communication apparatus (device).

A name assigned to a device is stored in the device name 257. This name is stored for example when the device is additionally registered in the group.

Information (for example, the address of an image file) relating to an icon representing the wireless communication apparatus (device) is stored in the icon information 258.

In this way, the various information stored in the device type 256, the device name 257, and the icon information 258 is information (display information) that the user can use to visually specify a wireless communication apparatus.

The group management server 200 is capable of using the group management database 240 and the terminal management database 250 stored in the storage unit 230 to specify the group to which each wireless communication apparatus belongs. The group management server 200 is also capable of managing the same MCIM shared by the wireless communication apparatuses belonging to the same group.

d. Example Configuration of Wireless Communication Apparatus

FIG. 4 is a block diagram of an internal configuration of the first wireless communication apparatus 300, according to the first exemplary embodiment. Note that since the internal configurations of the second wireless communication apparatus 400 and the third wireless communication apparatus 410 are the same as that of the first wireless communication apparatus 300, description thereof is omitted here. Also, in FIG. 4 onwards, when describing the second wireless communication apparatus 400 or the third wireless communication apparatus 410, names and reference numerals corresponding to the first wireless communication apparatus 300 are used.

The first wireless communication apparatus 300 includes an antenna 311, an antenna sharing unit 312, a modulating unit 321, a demodulating unit 322, a control unit 330, a memory 340, and the MCIM information storage unit 350. The first wireless communication apparatus 300 also includes an operation unit 360, a display unit 370, a location information acquiring unit 380, a microphone 391, and a speaker 392. Such components are connected by a bus 331. As one example, the first wireless communication apparatus 300 is realized by a mobile telephone apparatus capable of telephone calls and data communication.

For example, when a reception process is carried out, radio waves received by the antenna 311 are demodulated via the antenna sharing unit 312 by the demodulating unit 322 and demodulated reception data is supplied to the control unit 330. When the reception process is an incoming call process, the demodulated reception data (audio data) is outputted via the control unit 330 from the speaker 392 as sound.

When, for example, a transmission process is carried out, the transmission data outputted by the control unit 330 is modulated by the modulating unit 321 and the modulated transmission data is transmitted via the antenna sharing unit 312 from the antenna 311. When the transmission process is an outgoing call process, audio data inputted from the microphone 391 is modulated via the control unit 330 by the modulating unit 321 and modulated transmission data (audio data) is transmitted via the antenna sharing unit 312 from the antenna 311.

The control unit 330 carries out various control based on a control program stored in the memory 340. As one example, the control unit 330 is constructed of a microprocessor. For example, the control unit 330 is connected to the modulating unit 321 and the demodulating unit 322 and transmits and receives various data to and from the SHO 120 connected via the base stations 121, 122. The control unit 330 also carries out a connection process that connects to the RO 130 (with a limited connection) via a wireless connection based on the PCID, for example, without using the MCIM. Note that the control unit 330 is one example of a "transmission control unit" and a "display control unit" referred to in the patent claims.

The memory 340 is a memory storing a control program for various control executed by the control unit 330, transmission data, reception data, and the like. The memory 340 is constructed for example of ROM (Read Only Memory) and/or RAM (Random Access Memory). Also, various information for specifying the first wireless communication apparatus 300 (for example the terminal identification information (for example, "124567" shown in FIG. 3(b)) and the device name (for example, "My Mobile" shown in FIG. 3(b)) and the like are also stored in the memory 340. It is also possible to store an ID and a password (for example, "#01" and "poiuytr" shown in FIG. 3(a)) assigned to "group AA" to which the first wireless communication apparatus 300 belongs in the memory 340. Note that the various information for specifying the first wireless communication apparatus 300 and the ID and password of the group may be inputted every time as necessary by the user without being stored in the memory 340.

The MCIM information storage unit 350 is a memory storing an MCIM. As the MCIM information storage unit 350, as examples it is possible to use a Universal Integrated Circuit (UICC) card or a dedicated memory for securely storing an MCIM. Note that when a UICC card is used as the MCIM information storage unit 350, instead of the MCIM being permanently written, a card capable of a validation process and an invalidation process for the MCIM is used. That is, a device that enables the control unit 330 to carry out a validation process and an invalidation process for an MCIM based on transfer information that has been received from the antenna 311 and demodulated is used. Also, a device that allows the MCIM to be rewritten is used. Note that the validation process and invalidation process for the MCIM can be carried out according to the validation process and invalidation process defined by 3GPP (Third Generation Partnership Project). Also, by providing a secure region in the memory 340, the MCIM information storage unit 350 may be provided inside the memory 340.

Here, when for example a group list request operation has been received by the operation unit 360, the control unit 330 carries out transmission control that transmits a group list request via a wireless connection to the RO 130. As one example, this group list request requests the acquisition of group information stored in the group management server 200 and includes the terminal identification information stored in the memory 340.

Also, on receiving the group information outputted from the group management server 200 in response to the group list request, the control unit 330 carries out display control to display such group information on the display unit 370. An example of such display is shown in FIG. 7.

The operation unit 360 is an operation receiving unit receiving an operation input made by the user and outputs a signal in accordance with the received operation input to the control unit 330. The operation unit 360 includes various keys such as numeric keys and/or alphabet keys and receives an instruction operation (or "specified operation") made by the user who designates a group list request.

The display unit 370 is a display unit that displays various information (text information, time information, and the like) based on control by the control unit 330. As one example, the display unit 370 displays various information (for example, the display screens shown in FIGS. 5 to 8) relating to a group. Note that as examples, it is possible to use a display panel such as an organic EL (Electro Luminescence) panel or an LCD (Liquid Crystal Display) panel. It is also possible to integrally construct the operation unit 360 and the display unit 370 using a touch panel that enables the user to make an operation input by touching or placing his/her finger close to a display screen.

The location information acquiring unit 380 acquires location information showing the location where the first wireless communication apparatus 300 is present and outputs the acquired location information to the control unit 330. As one example, the location information acquiring unit 380 can be realized by a GPS (Global Positioning System) unit that calculates the location information using GPS signals received by a GPS signal reception antenna (not shown). The calculated location information includes various data relating to location, such as latitude, longitude, and altitude, at the time the GPS signals were received. It is also possible to use a location information acquiring apparatus acquiring location information according to a different method of acquiring location information. For example, it is possible to derive location information using access point information according to a wireless LAN (Local Area Network) present in the periphery and to use a location information acquiring apparatus that acquires such location information.

d. Example Display of Group Registration Screen

FIG. 5 is a diagram of a display screen displayed on the display unit 370 of the first wireless communication apparatus 300, according to the first exemplary embodiment. The group registration screen 500 shown in FIG. 5 is a display screen used to carry out an addition operation for additionally registering a new wireless communication apparatus in a group registered in the group management server 200.

The group registration screen 500 is provided with a group ID input region 501, a group password input region 502, a confirm button 503, and a return button 504. Note that in FIG. 5 an example of the group registration screen 500 for adding the first wireless communication apparatus 300 to "Group AA" is shown.

The group ID input region 501 is a region for inputting the ID of the group to which the first wireless communication apparatus 300 is to be added. That is, the ID of Group AA ("#01" in the group ID 241, 251 shown in FIGS. 3(a) and 3(b)) is inputted into the group ID input region 501.

The group password input region 502 is a region for inputting the password of the group to which the first wireless communication apparatus 300 is to be added. That is, the password of Group AA (the group password 242 "poiuytr" shown in FIG. 3(a)) is inputted into the group password input region 502. Note that since the password is not displayed on the actual screen for security purposes, the password is shown as "******" in FIG. 5.

The confirm button 503 is a button pressed when confirming the operation content after making the operations (input operations, selection operations) described above.

The return button 504 is a button pressed when returning to a display screen that was displayed immediately before the group registration screen 500, for example. Note that since the confirm buttons 515, 526 and the return buttons 516, 527 shown in FIGS. 6 and 7 are substantially the same, description of such buttons is omitted for FIGS. 6 and 7.

As shown in FIG. 5, when a new wireless communication apparatus (the first wireless communication apparatus 300) is additionally registered in Group AA (shown in FIG. 3(a)) registered in the group management server 200, the ID and password of the group are inputted. If a pressing operation for the confirm button 503 is carried out next after such inputting, a group addition request is transmitted from the first wireless communication apparatus 300 via the RO 130 to the group management server 200. Such group addition request includes information (for example, information relating to the wireless communication apparatus shown in FIG. 3(b), i.e., the terminal identification information 252, . . . , the icon information 258) relating to the first wireless communication apparatus 300. The various information included in the group addition request is then stored in the terminal management database 250 so as to be associated with the Group AA related to the group addition request.

Here, it is possible for the user to indicate the address (for example, a Uniform Resource Locator (URL)) of the group management server 200 by way of a manual operation of the first wireless communication apparatus 300. It is also possible to register such address in advance in the first wireless communication apparatus 300 (for example, by storing the address in the memory 340) and to use such registered address when the group management server 200 is accessed from the first wireless communication apparatus 300.

It is also assumed that the content of the terminal management database 250 (for example, the device type 256, the device name 257, and the icon information 258) can be changed as appropriate using the respective wireless communication apparatuses. For example, it may be possible to connect the first wireless communication apparatus 300 via the Internet to an information processing apparatus (for example, a server of a company that provides Internet services) and to update the content of the terminal management database 250 via such information processing apparatus. As another example, it may be possible to connect to the Internet or the like using another appliance (for example, a personal computer belonging to the user) and to carry out a setting operation for the group, to change the content of the terminal management database 250, or the like.

e. Example Display of Group List Request Operation Screen

FIG. 6 is a diagram of a display screen displayed on the display unit 370 of the first wireless communication apparatus 300, according to the first exemplary embodiment.

The display screen 510 shown in FIG. 6 is a display screen for selecting a function to be carried out by the first wireless communication apparatus 300. More specifically, the display screen 510 is provided with a phone button 511, a camera button 512, an e-mail button 513, a group list request button 514, a confirm button 515, and a return button 516.

The phone button 511 is a button pressed when using a telephone function, the camera button 512 is a button pressed when using a camera function, and the e-mail button 513 is a button pressed when using an e-mail function. Note that it is also possible to provide other buttons for use on the display screen 510 (such as a button pressed when using an Internet function).

The group list request button 514 is a button pressed when requesting a list of information (group information) relating to the wireless communication apparatuses composing a group (Group AA) to which the first wireless communication apparatus 300 belongs.

The confirm button 515 is a button pressed after a pressing operation selecting one of the phone button 511, the camera button 512, the e-mail button 513, and the group list request button 514 to confirm such selection.

f. Example Display of Group List Display Screen

FIG. 7 is a diagram of a display screen displayed on the display unit 370 of the first wireless communication apparatus 300 according to the first exemplary embodiment.

The group list display screen 520 shown in FIG. 7 is a display screen displaying a list of information (group information) relating to the wireless communication apparatuses belonging to a group, and is a display screen for transferring a valid MCIM.

More specifically, the group list display screen 520 is provided with a transfer destination selection region 521, a device icon display region 522, a device name display region 523, an MCIM valid/invalid information display region 524, and an operator display region 525. The group list display screen 520 is also provided with a confirm button 526 and a return button 527.

Check boxes for selecting the transfer destination wireless communication apparatus when transferring a valid MCIM between the wireless communication apparatuses belonging to a group are displayed in the transfer destination selection region 521. For example, when a selection operation has been carried out for the transfer destination wireless communication apparatus, a check mark is added to the transfer destination selection region 521 corresponding to the selected wireless communication apparatus.

Icons representing the respective wireless communication apparatuses belonging to the group are displayed in the device icon display region 522. As one example, the icons stored in the terminal management database 250 of the group management server 200 (the icon information 258 shown in FIG. 3(b)) are displayed.

Names (device names) representing the respective wireless communication apparatuses belonging to the group are displayed in the device name display region 523. As one example, the device names stored in the terminal management database 250 of the group management server 200 (the device names 257 shown in FIG. 3(b)) are displayed.

Valid/invalid information for the MCIM of the respective wireless communication apparatuses belonging to the group is displayed in the MCIM valid/invalid information display region 524. As one example, the valid/invalid information stored in the terminal management database 250 of the group management server 200 (the valid/invalid information 254 shown in FIG. 3(*b*)) is displayed. That is, by looking at "valid" or "invalid" displayed in the MCIM valid/invalid information display region 524, the user can easily and visually grasp the wireless communication apparatus that is storing a valid MCIM. Also, to make it even easier for the user to grasp the wireless communication apparatus that is storing the valid MCIM, the information relating to the wireless communication apparatus that is storing the valid MCIM is shown surrounded by a dotted rectangle 528.

The name of the operator (communication provider) of the valid MCIM stored by one of the wireless communication apparatuses belonging to the group is displayed in the operator display region 525. As one example, the operator information stored in the terminal management database 250 of the group management server 200 (the operator 255 shown in FIG. 3(*b*)) is displayed.

The confirm button 526 is a button pressed after carrying out an operation that transfers the MCIM in the group list display screen 520 to confirm such operation.

g. Example Display Screens of Transfer Process Results

FIGS. 8(*a*) and 8(*b*) are diagrams of display screens that can be displayed on the display unit 370 of the first wireless communication apparatus 300, according to the first exemplary embodiment. The display screens 530 and 540 shown in FIGS. 8(*a*) and 8(*b*) are display screens displayed when the first wireless communication apparatus 300 corresponds to the transfer destination wireless communication apparatus and the transfer source wireless communication apparatus respectively after transfer of the MCIM has been carried out.

In FIG. 8(*a*), the display screen 530 displayed on the transfer source wireless communication apparatus after transfer of the MCIM has been carried out is shown. In the display screen 530, a transfer destination device display region 531 and a confirm button 532 are displayed.

The transfer destination device display region 531 is a region in which information relating to the transfer destination wireless communication apparatus to which the valid MCIM has been transferred is displayed.

The confirm button 532 is a button pressed when switching to another display screen (for example, an initial screen) after confirming the content of the display screen 530.

In FIG. 8(*b*), the display screen 540 displayed on the transfer destination wireless communication apparatus after transfer of the MCIM has been carried out is shown. In the display screen 540, a transfer source device display region 541 and a confirm button 542 are displayed.

The transfer source device display region 541 is a region in which information relating to the transfer source wireless communication apparatus from which the valid MCIM has been transferred is displayed.

The confirm button 542 is a button pressed when switching to another display screen (for example, an initial screen) after confirming the content of the display screen 540.

Note that although only examples of display screens displayed on the first wireless communication apparatus 300 are shown in FIGS. 5 to 8(*b*), it is assumed that the display screens displayed on the other wireless communication apparatuses are substantially the same.

h. Example of Communication When Making a Group List Request and an MCIM Transfer Request FIGS. 9 and 10 are flowcharts of a communication process performed by the communications devices of communication system 100, according to the first exemplary embodiment.

In FIGS. 9 and 10, an imaginary case is explained where Group AA is composed of three wireless communication apparatuses and the first wireless communication apparatus 300 is storing a valid MCIM. Also, in FIGS. 9 and 10, an example of a communication process when transferring the valid MCIM from the first wireless communication apparatus 300 to the second wireless communication apparatus 400 by operating the first wireless communication apparatus 300 is shown. Note that in FIGS. 9 and 10, it is assumed that the first wireless communication apparatus 300 is connected to the SHO 120 (601) and that the second wireless communication apparatus 400 and the third wireless communication apparatus 410 are connected to the RO 130 (602). Note also that the third wireless communication apparatus 410 is not shown in FIGS. 9 and 10.

First, according to a user operation, a display screen for carrying out a group list request operation is displayed on the display unit 370 of the first wireless communication apparatus 300. As one example, the display screen 510 shown in FIG. 6 is displayed on the display unit 370 of the first wireless communication apparatus 300.

Here, in the display screen 510 shown in FIG. 6, the group list request button 514 is pressed and after such pressing operation, the confirm button 515 is pressed (603). In this way, when a group list request operation has been received at the first wireless communication apparatus 300 (603), a group list request is transmitted from the first wireless communication apparatus 300 to the RO 130 (604 to 607). In this case, since the first wireless communication apparatus 300 is connected to the SHO 120 (601), the group list request is transmitted from the first wireless communication apparatus 300 via the SHO 120 to the RO 130 (604 to 607).

Here, the group list request includes identification information (the terminal identification information stored in the memory 340 (as one example "124567" shown in FIG. 3(*b*)) of the wireless communication apparatus (the first wireless communication apparatus 300) that is making the group list request.

When the RO 130 receives the group list request (607), the control unit 135 of the RO 130 transmits the terminal identification information included in the received group list request to the group management server 200 (608 and 609).

When the terminal identification information has been received by the group management server 200 (609), the control unit 220 of the group management server 200 extracts a group to which the wireless communication apparatus related to the received terminal identification information belongs based on the content of the storage unit 230 (610). For example, a case is imagined where a group list request is transmitted from the first wireless communication apparatus 300 to the RO 130 and the terminal identification information (the terminal identification information of the first wireless communication apparatus 300) included in such group list request is received by the group management server 200. In this case, "Group AA (shown in FIG. 3(*a*))" is extracted as the group to which the first wireless communication apparatus 300 belongs (610).

Next, the control unit 220 transmits the group information related to the extracted group to the RO 130 (611 and 612). Here, the group information is information (the terminal identification information 252, . . . , the icon information 258) relating to the re-spective wireless communication apparatuses stored in the terminal management database 250 shown in FIG. 3(*b*).

When the RO 130 has received the group information (612), the control unit 135 of the RO 130 transmits the received group information to the wireless communication apparatus (the first wireless communication apparatus 300) that transmitted the group list request (613 to 616). In this case, since the first wireless communication apparatus 300 is connected to the SHO 120 (601), the group information is transmitted from the RO 130 via the SHO 120 to the first wireless communication apparatus 300 (613 to 616).

When the first wireless communication apparatus 300 has received the group information (616), the control unit 330 of the first wireless communication apparatus 300 displays the received group information on the display unit 370 (617). For example, the group list display screen 520 shown in FIG. 7 is displayed on the display unit 370. Although only some of the received group information is displayed in the display unit 370 in the example shown in FIG. 7, it is also possible to display other content or all of the received group information on the display unit 370. It is also possible to change the items on display based on a user setting.

In this way, when the group list display screen 520 shown in FIG. 7 is displayed on the display unit 370, a check mark is added to the check box of the transfer destination (the transfer destination selection region 521) to which the MCIM is to be transferred. For example, as shown in FIG. 7, to set the second wireless communication apparatus 400 as the transfer destination, a check mark is added to the corresponding check box (the transfer destination selection region 521). After a check mark has been added to the transfer destination check box (the transfer destination selection region 521) the confirm button 526 is pressed (618). In this way, when an MCIM transfer instruction operation has been received at the first wireless communication apparatus 300 (618), an MCIM transfer request is transmitted from the first wireless communication apparatus 300 to the RO 130 (619 to 622). In this case also, since the first wireless communication apparatus 300 is connected to the SHO 120 (601), the MCIM transfer request is transmitted from the first wireless communication apparatus 300 via the SHO 120 to the RO 130 (619 to 622).

When the RO 130 has received the MCIM transfer request (622), the control unit 135 of the RO 130 transmits an MCIM invalidation instruction for invalidating the MCIM of the transfer source wireless communication apparatus relating to the MCIM transfer request to the SHO 120 (623 and 624). That is, the validation and invalidation of an MCIM can be carried out by the SHO 120 alone. For this reason, the RO 130 instructs the SHO 120 to invalidate the MCIM of the transfer source wireless communication apparatus (the first wireless communication apparatus 300) and the SHO 120 carries out the MCIM invalidation process.

When the SHO 120 has received the MCIM invalidation instruction (624), the SHO 120 transmits MCIM invalidation information to the first wireless communication apparatus 300 (625 and 626). The MCIM invalidation information is information for invalidating an MCIM when a valid MCIM is stored in a wireless communication apparatus.

When the first wireless communication apparatus 300 has received the MCIM invalidation information (626), an invalidation process for the MCIM stored in the MCIM information storage unit 350 of the first wireless communication apparatus 300 is carried out (627). Since by doing so, the MCIM stored in the first wireless communication apparatus 300 is invalidated, the first wireless communication apparatus 300 becomes incapable of connecting to the SHO 120 based on the MCIM. For this reason, the first wireless communication apparatus 300 becomes connected to the RO 130 with a limited connection based on the PCID (628).

Once the MCIM invalidation process has been carried out at the transfer source (the first wireless communication apparatus 300) (627) and the connection between the transfer source and the SHO 120 has been disconnected, this disconnecting of the connection is detected by the control unit 135 of the RO 130 (629). As one example, it is possible for the control unit 135 to detect the disconnecting of the connection (629) by transmitting a notification from the transfer source (the first wireless communication apparatus 300) to the RO 130 after the MCIM invalidation process has been carried out. It is also possible for the control unit 135 to detect the disconnecting of the connection (629) by itself detecting that the transfer source (the first wireless communication apparatus 300) has become connected to the RO 130 with a limited connection based on a PCID.

In this way, when the control unit 135 has detected that the transfer source and the SHO 120 are disconnected (629), the control unit 135 transmits an instruction (change instruction) for changing the content of the terminal management database 250 (shown in FIG. 3(b)) to the group management server 200 (630 and 631). When the group management server 200 has received the change instruction (631), the control unit 220 changes the content of the terminal management database 250 based on the change instruction (632). For example, in the valid/invalid information 254 shown in FIG. 3(b), the first wireless communication apparatus 300 (the terminal identification information 252 "124567") is changed from "valid" to "invalid". Meanwhile, the second wireless communication apparatus 400 (the terminal identification information 252 "311111") is changed from "invalid" to "valid".

Also, when the control unit 135 of the RO 130 has detected that the transfer source and the SHO 120 are disconnected (629), the control unit 135 transmits an MCIM validation instruction to the SHO 120 (633 and 634). The MCIM validation instruction is an instruction for validating the MCIM of the transfer destination wireless communication apparatus (the second wireless communication apparatus 400) related to the MCIM transfer request.

When the SHO 120 has received the MCIM validation request (634), the SHO 120 transmits the MCIM validation information to the second wireless communication apparatus 400 (635 to 638). The MCIM validation information is information for setting a valid MCIM in a wireless communication apparatus. In this case, since the second wireless communication apparatus 400 is connected to the RO 130 (602), the MCIM validation information is transmitted via the RO 130 from the SHO 120 to the RO 130 (635 to 638).

When the second wireless communication apparatus 400 has received the MCIM validation information (638), a validation process is carried out for the MCIM stored in the MCIM information storage unit 350 of the second wireless communication apparatus 400 (639). Since by doing so a valid MCIM is set in the second wireless communication apparatus 400, the second wireless communication apparatus 400 becomes capable of connecting to the SHO 120 based on the MCIM (640 and 641). This means that the second wireless communication apparatus 400 becomes connected to the SHO 120 with a connection based on the MCIM (642).

Note that although an example whether usage rights over the MCIM are transferred by carrying out validation/invalidation has been described in this embodiment, it is also possible to transfer usage rights over the MCIM by transferring the MCIM itself. In such case, once the MCIM invalidation information has been transferred to the first wireless communication apparatus 300, the MCIM stored in the first wireless communication apparatus 300 is invalidated (deleted). Meanwhile, once the MCIM validation information (including setting information for setting the MCIM) has been transmitted to the second wireless communication apparatus 400, a valid MCIM is recorded in the MCIM information storage unit 350 of the second wireless communication apparatus 400 based on such setting information. By doing so, a valid MCIM is set in the second wireless communication apparatus 400.

Also, an example where one wireless communication apparatus stores one MCIM and use rights over such MCIM are transferred by validating and invalidating the MCIM has been described in the present embodiment. However, it is also possible for contact authentication information (referred to for example as "first contract authentication information") used only for a connection related to a transfer process of use rights over the MCIM (referred to for example as "second contract authentication information") to be stored in each wireless communication apparatus and for a connection related to the transfer process to be made using the first contract authentication information.

Also, although an example where a group list request and an MCIM transfer request are made using the first wireless communication apparatus 300 that stores a valid MCIM is shown in FIGS. 9 and 10, it is also possible for such requests to be made from wireless communication apparatuses that do not store a valid MCIM. An example of this is shown in FIGS. 11 and 12.

i. Example of Communication When Various Operations are Carried Out from a Wireless Communication Apparatus Not Storing a Valid MCIM FIGS. 11 and 12 are flowcharts of a communication process performed by the communications devices of communication system 100, according to the first exemplary embodiment. Note that the sequence charts shown in FIGS. 11 and 12 are modifications to FIGS. 9 and 10, parts that are the same as FIGS. 9 and 10 have been assigned the same reference numerals, and the description thereof is partially omitted. FIGS. 11 and 12 show an example of the communication process when transferring a valid MCIM from the first wireless communication apparatus 300 to the second wireless communication apparatus 400 by operating the second wireless communication apparatus 400 that does not store a valid MCIM.

The processes (651 to 653) shown in FIG. 11 correspond to the processes (603 to 607) shown in FIG. 9. However, the procedure in FIGS. 11 and 12 differs in that the group list request operation is carried out at the second wireless communication apparatus 400 and the group list request is transmitted directly from the second wireless communication apparatus 400 to the RO 130 (652 and 653). The processes (654 to 658) shown in FIG. 11 meanwhile correspond to the processes (608 to 612) shown in FIG. 9.

Also, the processes (659 to 661) shown in FIG. 11 correspond to the processes (613 to 617) shown in FIG. 9. However, the procedure in FIGS. 11 and 12 differs in that the group information is directly transmitted from the RO 130 to the second wireless communication apparatus 400 without passing the SHO 120 (659 and 660).

The processes (662 to 670) shown in FIG. 12 correspond to the processes (618 to 628) shown in FIG. 10. However, the procedure in FIGS. 11 and 12 differs in that the MCIM transfer instruction operation is carried out at the second wireless communication apparatus 400 and the MCIM transfer request is directly transmitted from the second wireless communication apparatus 400 to the RO 130 (663 and 664).

The processes (671 to 684) shown in FIG. 12 correspond to the processes (629 to 642) shown in FIG. 10.

j. Example Operation of Communication System

Next, the operation of the communication system 100 according to the first exemplary embodiment will be described with reference to the drawings.

k. Example Operation of Wireless Communication Apparatus

FIG. 13 is a flowchart of a communication process performed the first wireless communication apparatus 300, according to the first exemplary embodiment. Here, an example of where the first wireless communication apparatus 300 makes a group list request is described with reference to FIG. 13. Note that although an example operation of only the first wireless communication apparatus 300 is shown in FIG. 13, such operation can be applied in the same way to the other wireless communication apparatuses.

First, the control unit 330 determines whether a group list request operation has been carried out (step S901) and when a group list request operation has not been carried out, such monitoring is continued. As one example, a group list request operation is carried out in the display screen 510 shown in FIG. 6. When a group list request operation has been carried out (step S901), the control unit 330 transmits the group list request to the RO 130 (step S902). Here, if the first wireless communication apparatus 300 stores a valid MCIM, the group list request is transmitted via the SHO 120 to the RO 130. Meanwhile, if the first wireless communication apparatus 300 does not store a valid MCIM, the group list request is directly transmitted to the RO 130 without passing the SHO 120.

Next, the control unit 330 determines whether the group information has been received (step S903) and if the group information has not been received, such monitoring is continued. If the group information has been received (step S903), the control unit 330 displays the received group information on the display unit 370 (step S904). As one example, the group list display screen 520 shown in FIG. 7 is displayed on the display unit 370.

After this, the control unit 330 determines whether an MCIM transfer instruction operation has been carried out (step S905) and if an MCIM transfer instruction operation has not been carried out, such monitoring is continued. As one example, an MCIM transfer instruction operation is carried out in the group list display screen 520 shown in FIG. 7. When an MCIM transfer instruction operation has been carried out (step S905), the control unit 330 transmits an MCIM transfer request to the RO 130 (step S906). In this case also, in the same way as step S902, transmission via the SHO 120 or direct transmission to the RO 130 is carried out depending on whether the first wireless communication apparatus 300 stores a valid MCIM.

FIG. 14 is a flowchart showing an example of a processing procedure of the MCIM validation/invalidation process carried out by the first wireless communication apparatus 300 according to the first exemplary embodiment. An example where the first wireless communication apparatus 300 carries out the MCIM validation/invalidation process will now be described with reference to FIG. 14. Note that although an example of operation at the first wireless communication apparatus 300 is shown in FIG. 14, such operation can be applied in the same way to the other wireless communication apparatuses.

First, the control unit 330 determines whether MCIM validation information has been received (step S911). If MCIM validation information has been received (step S911), the control unit 330 carries out a validation process for an MCIM stored in the MCIM information storage unit

350 (step S912). Next, the control unit 330 carries out a connection process for connecting to the SHO 120 based on the MCIM (step S913).

If MCIM validation information has not been received (step S911), the control unit 330 determines whether MCIM invalidation information has been received (step S914), and if the MCIM invalidation information has not been received, such monitoring is continued. Meanwhile, if the MCIM invalidation information has been received (step S914), the control unit 330 carries out an invalidation process for an MCIM stored in the MCIM information storage unit 350 (step S915). After this, the control unit 330 carries out a connection process for connecting to the RO 130 based on the PCID (step S916).

1. Example Operation of the RO

FIG. 15 is a flowchart of a communication process carried out by the RO 130, according to the first exemplary embodiment. An example where group information corresponding to a group list request is transmitted to a wireless communication apparatus when such group list request has been received from the wireless communication apparatus will now be described with reference to FIG. 15.

First, the control unit 135 determines whether a group list request has been received (step S921) and when a group list request has not been received, such monitoring is continued. Meanwhile, when a group list request has been received (step S921), the control unit 135 transmits the terminal identification information included in the received group list request to the group management server 200 (step S922).

Next, the control unit 135 determines whether group information corresponding to the group list request has been received from the group management server 200 (step S923) and when the group information has not been received, such monitoring is continued. Meanwhile, when group information corresponding to the group list request has been received (step S923), the control unit 135 transmits the received group information to the wireless communication apparatus that transmitted the group list request (step S924). Here, if the wireless communication apparatus that is the transmission destination stores a valid MCIM, the group information is transmitted via the SHO 120, while if the wireless communication apparatus that is the transmission destination does not store a valid MCIM, the group information is transmitted directly without passing the SHO 120.

FIG. 16 is a flowchart showing an example of the processing procedure of the MCIM validation/invalidation instruction process carried out by the RO 130 according to the first exemplary embodiment. An example of where an MCIM transfer request has been received from a wireless communication apparatus and MCIM invalidation/validation instructions are issued in accordance with such transfer request will now be described with reference to FIG. 16.

First, the control unit 135 determines whether an MCIM transfer request has been received (step S931) and when an MCIM transfer request has not been received, such monitoring is continued. Meanwhile, if an MCIM transfer request has been received (step S931), the control unit 135 transmits an MCIM invalidation instruction for invalidating the MCIM of the transfer source wireless communication apparatus related to the MCIM transfer request to the SHO 120 (step S932).

Next, the control unit 135 determines whether the connection between the transfer source and the SHO 120 has been disconnected (step S933) and if such disconnecting has not been detected, the monitoring is continued. Meanwhile if the connection between the transfer source and the SHO 120 has been disconnected (step S933), the control unit 135 transmits an instruction (change instruction) for changing the content of the terminal management database 250 (see FIG. 3(*b*)) to the group management server 200 (step S934).

After this, the control unit 135 transmits an MCIM validation instruction for validating the MCIM of the transfer destination wireless communication apparatus related to the MCIM transfer request to the SHO 120 (step S935).

m. Example Operation of Group Management Server

FIG. 17 is a flowchart of a group information transmission process carried out by the group management server 200, according to the first exemplary embodiment. An example where group information is extracted in response to a group list request transmitted from a wireless communication apparatus and transmitted to the RO 130 will now be described with reference to FIG. 17.

First, the control unit 220 determines whether terminal identification information has been received from the RO 130 (step S941) and if the terminal identification information has not been received, such monitoring is continued. Meanwhile, if the terminal identification information has been received from the RO 130 (step S941), the control unit 220 carries out an extraction process that extracts the group to which the wireless communication apparatus related to the received terminal identification information belongs based on the content of the storage unit 230 (step S942). Note that steps S941, S942 are examples of the "extraction procedure" referred to in the patent claims.

Next, it is determined whether a group related to such terminal identification information has been extracted (step S943) and when a group related to such terminal identification information has been extracted, the control unit 220 transmits the group information relating to the extracted group to the RO 130 (step S944). By doing so, the group information is transmitted from the RO 130 to the wireless communication apparatus that transmitted the group list request. Note that steps S943, S944 are examples of the "control procedure" referred to in the patent claims.

On the other hand, if a group related to such terminal identification information has not been extracted (step S945), the control unit 220 transmits a message that a group to which the wireless communication apparatus related to such terminal identification information belongs does not exist to the RO 130 (step S945). By doing so, such message is transmitted from the RO 130 to the wireless communication apparatus that transmitted the group list request.

2. Modifications

In the first exemplary embodiment, an example where the group management server 200 is configured as a single device has been described. However, it is also possible to apply the embodiment of the present disclosure to an information processing system where the various components (as examples, the control unit 220 and the storage unit 230) of the group management server 200 are constructed of a plurality of devices.

In the first exemplary embodiment, groups composed of two or three wireless communication apparatuses (Group AA, Team BB) have been described as examples. However, it is also possible to apply the first exemplary embodiment to a group composed of four or more wireless communication apparatuses.

Also, in the first exemplary embodiment, an example has been described where a single user has a plurality of wireless communication apparatuses and one MCIM is shared between such wireless communication apparatuses. However, when a single user has a plurality of wireless communication apparatuses, it is also possible to share two or more MCIM between such plurality of wireless communication apparatuses. For example, if one user has M (where M is 3 or more) wireless communication apparatuses, it is possible to set the MCIM in N (where N is more than 1 and M is more than N) wireless communication apparatuses out of such M wireless communication apparatuses and to set the MCIM in the other wireless communication apparatuses as invalid. In such case, out of the valid/invalid information 254 of the terminal management database 250 shown in FIG. 3(b), "valid" is stored in N rows and "invalid" is stored in the other rows.

Also, in the first exemplary embodiment, an example of where a single user has a plurality of wireless communication apparatuses and an MCIM is shared between such wireless communication apparatuses is described. However, it is also possible to apply the first exemplary embodiment to a case where a plurality of users have wireless communication apparatuses (a plurality of wireless communication apparatuses) and an MCIM is shared between such wireless communication apparatuses. For example, a group where one user owns one wireless communication apparatus (for example, a five-person group) is also imagined. In this case, it is possible to set the MCIM of the wireless communication apparatuses of only two out of the five people that compose the group as valid and to set the MCIM of the wireless communication apparatuses of the other three people as invalid. In such case, it is possible to carry out group registration in the terminal management database 250 shown in FIG. 3(b), and to carry out a transfer process between the members registered in the group. When a transfer process is carried out between users in this way, a number of contracts with the communication provider equal to the number of MCIM that can be transferred between members may be required.

It is also possible to apply the first exemplary embodiment to another mobile wireless communication apparatuses (for example a dedicated data communication terminal apparatus) or fixed-type wireless communication apparatuses (for example, a wireless communication apparatus for data collection at a vending machine).

Examples where use rights over an MCIM are used as network connection rights are described above in the first exemplary embodiment. However, it is also possible to apply the first exemplary embodiment to other network connection rights for connecting to a specified network based on other information (for example, a USIM (Universal Subscriber Identity Module)).

Here, as one example, a case is imagined where a group that shares an MCIM relating to the first communication provider is managed by the first communication provider. In such case, as one example, it would be conceivable for the user to change the MCIM shared by the group to another communication provider (a second communication provider). In this case, it is conceivable that it would also be necessary to change the manager who manages the group. In this way, if the manager who manages the group is changed every time the communication provider of the MCIM to be shared is changed, there is the risk that the change process will become complex.

On the other hand, in the present embodiment, a manager (the group management server 200) that differs to the SHO and RO manages the group that shares the MCIM. In this way, by having the group management server 200 manage the MCIM of the plurality of wireless communication apparatuses that compose the group, it will not be necessary to change the manager that manages the group even when the communication provider of the MCIM that is shared by the group is changed.

Also, according to the embodiment of the present disclosure, as one example it is possible to easily share the contract authentication information (MCIM) for connecting to the communication system 100 between a plurality of wireless communication apparatuses in a group. For example, it is possible to easily carry out a transfer process for a valid MCIM between a plurality of wireless communication apparatuses by way of a simple user operation. This means that even if an individual has a plurality of wireless communication apparatuses, for example, it will be possible to easily use the plurality of wireless communication apparatuses without signing contracts for a plurality of wireless connection services. That is, it is possible to easily share the rights (network connection rights) for connecting to a network between a plurality of wireless communication apparatuses and therefore possible to easily use such rights.

That is, according to the first exemplary embodiment, it is possible to realize a public wireless communication system composed of a plurality of wireless communication apparatuses that compose a group, the group management server 200 that manages such group, the SHO 120, and the RO 130. According to such public wireless communication system (a contract sharing system for wireless communication apparatuses), it is possible to facilitate use of the right (network connection rights) to connect to a network between a plurality of wireless communication apparatuses.

Note that the embodiments given above describe examples used to embody the present disclosure and that elements in the embodiments correspond to elements in the patent claims. In the same way, elements in the patent claims correspond to elements in the embodiments of the present disclosure that have been given the same names. However, it should be understood by those skilled in the art that various modifications, combinations, sub-combinations and alterations may occur depending on design requirements and other factors insofar as they are within the scope of the appended claims or the equivalents thereof.

The processing procedures described in the embodiments given above may take the form of a method including a series of such procedures and may also take the form of a computer programs and sets of instructions can be stored within one or more computer readable media. Additionally or alternatively, computer programs and sets of instructions may also be received via a communications interface and stored on the one or more computer readable media. Examples of such computer-readable media include, but are not limited to, random access memory (RAM), read-only memory (ROM), and various tangible, non-transitory computer-readable media such as hard disks, flash memory, compact discs (CDs), minidisks (MDs), a DVD (Digital Versatile Disc), a memory card, a Blu-ray Disc (registered trademark) or the like.

Such computer programs and instructions, when executed by at at least one processor of a disclosed information processing apparatus (e.g., the SHO, the RO, one or more of the wireless communications devices, or the group management server) enable the at least one processor to perform the computer-implemented methods described herein. Examples of program instructions include, for example, machine code, such as code produced by a compiler, and files containing a high-level code that can be executed by the processor using an interpreter.

Additionally, the present technology may also be configured as below.

(1)
An information processing apparatus, comprising:
a receiving unit configured to receive, from a first communications device, a request for information identifying at least one second communications device, the second communications device being associated with the first communications device, and the first and second communications devices sharing at least one connection right; and a control unit configured to:
obtain the information, based on the received request; and
generate an instruction to transmit the information to the first communications device.

(2)
The apparatus of (1), wherein the at least one shared connection right is established based on information associated with a machine communication identity module.

(3)
The apparatus of (2), wherein the information processing apparatus corresponds to a selected home operator of a wireless network, the selected home operator being associated with the machine communication identity module.

(4)
The apparatus of any one of (1) to (3), wherein the first and second communications devices share a plurality of connection rights.

(5)
The apparatus of any one of (1) to (4), further comprising a communications unit configured to establish a communications session with the first communications device in accordance with the at least one shared connection right.

(6)
The apparatus of any one of (1) to (5), wherein the communications unit is further configured to transmit, in response to the generated instruction, the information identifying the second communications device to the first communications device.

(7)
The apparatus of any one of (1) to (6), wherein the received request comprises information identifying the first communications device.

(8)
The apparatus of (7), wherein the identifying information comprises a numerical identifier assigned to the first communications device.

(9)
The apparatus of (7) or (8), wherein the control unit is further configured to:
generate an instruction to transmit the received request to a registration server; and
receive, from the registration server in response to the transmitted request, the information identifying the second communications device.

(10)
The apparatus of (9), wherein the registration server is configured to obtain the information identifying the second device from a group management server using the information identifying the first communications device.

(11)
The apparatus of any one of (1) to (10), wherein the information identifying the second communications device comprises information identifying a group of communications devices associated with the second communications device.

(12)
The apparatus of (12), wherein:
the group of devices comprises at least the first and second communications devices; and
the group of devices shares the at least one connection right.

(13)
The apparatus of any one of (1) to (12), wherein the first communications device is associated with a first connection right, and the second communications device is associated with a second connection right, the first connection right being different from the second connection right.

(14)
The apparatus of (13), wherein:
the first connection right is established based on information associated with a machine connection identity module; and
the second connection right is based on information associated with a provisional connective identity.

(15)
The apparatus of (13) or (14), wherein the receiving unit is configured to receive, from the first communications device, a request to transfer the first connection right to the second communications device.

(16)
The apparatus of (15), wherein the control unit is further configured to obtain, in response to the transfer request, an instruction to invalidate the first connection right at the first communications device, and an instruction to validate the first connection right at the second communications device.

(17)
The apparatus of (16), wherein the control unit is further configured to generate instructions to transmit the invalidation instruction and the validation instruction to corresponding ones of the first and second communications devices.

(18)
The apparatus of (17), further comprising a communications unit configured to establish a communications session with the second communications device in accordance with the validated first connection right.

REFERENCE SIGNS LIST

100 Communication System
110 Public Network
120 SHO
130 RO
121, 122, 131, 132 Base Station
135, 220, 330 Control Unit
141-143 Wireless Connection
200 Group Management Server
210 Communication Unit
230 Storage Unit
240 Group Management Database
250 Terminal Management Database
300 First Wireless Communication Apparatus
311 Antenna
312 Antenna Sharing Unit
321 Modulating Unit
322 Demodulating Unit
331 Bus
340 Memory
350 MCIM Information Storage Unit
360 Operation Unit
370 Display Unit
380 Location Information Acquiring Unit
391 Microphone
392 Speaker
400 Second Wireless Communication Apparatus
410 Third Wireless Communication Apparatus

The invention claimed is:

1. An information processing apparatus, comprising:
a receiving unit configured to:
receive, from a first communication device, a first request for group identification information identifying a group of devices that includes a plurality of second communication devices sharing at least one connection right with the first communication device to access a network; and
receive from, the first communication device, a second request to transfer a first connection right to a second communication device based on the group identification information; and
a control unit configured to:
obtain the group identification information, based on the received first request;
generate a first instruction to transmit the group identification information to the first communication device;
cause the first communication device to display the group identification information on a display; and
invalidate a first machine communication identity module (MCIM) of the first communication apparatus and validate a second MCIM of the second communication apparatus based on the second request.

2. The information processing apparatus of claim 1, wherein the at least one connection right is established based on information associated with a machine communication identity module.

3. The information processing apparatus of claim 2, wherein the information processing apparatus corresponds to a selected home operator of a wireless network, wherein the selected home operator is associated with the machine communication identity module.

4. The information processing apparatus of claim 1, wherein the first communication device and the plurality of second communication devices share a plurality of connection rights.

5. The information processing apparatus of claim 1, further comprising a communication unit configured to establish a communication session with the first communication device based on the at least one connection right.

6. The information processing apparatus of claim 5, wherein the communication unit is further configured to transmit, based on the generated first instruction, the group identification information to the first communication device.

7. The information processing apparatus of claim 1, wherein the received first request comprises identification information identifying the first communication device.

8. The information processing apparatus of claim 7, wherein the identification information comprises a numerical identifier assigned to the first communication device.

9. The information processing apparatus of claim 7, wherein the control unit is further configured to:
generate a second instruction to transmit the received first request to a registration server; and
receive, from the registration server based on the transmitted first request, the group identification information.

10. The information processing apparatus of claim 9, wherein the registration server is configured to obtain the group identification information from a group management server using the identification information identifying the first communication device.

11. The information processing apparatus of claim 1, wherein the group of devices comprises at least the first communication device and the plurality of second communication devices.

12. The information processing apparatus of claim 1, wherein the first communication device is associated with the first connection right, and a second communication device of the plurality of second communication devices is associated with a second connection right, wherein the first connection right is different from the second connection right.

13. The information processing apparatus of claim 12, wherein
the first connection right is established based on information associated with a machine communication identity module; and
the second connection right is based on information associated with a provisional connective identity.

14. The information processing apparatus of claim 12, wherein the control unit is further configured to obtain, based on the second request, an invalidation instruction to invalidate the first connection right at the first communication device, and a validation instruction to validate the first connection right at the second communication device.

15. The information processing apparatus of claim 14, wherein the control unit is further configured to transmit the invalidation instruction and the validation instruction to corresponding ones of the first communication device and the second communication device.

16. A method, comprising:
in an information processing apparatus comprising at least one processor and a memory storing instructions for execution by the at least one processor:
receiving, from a first communication device, a first request for group identification information identifying a group of devices that includes a plurality of second communication devices sharing at least one connection right with the first communication device to access a network and a second request to transfer a first connection right to a second communication device based on the group identification information;
obtaining the group identification information, based on the received request;
generating, using the at least one processor, an instruction to transmit the group identification information to the first communication device;
causing the first communication device to display the group identification information on a display; and
invalidate a first machine communication identity module (MCIM) of the first communication apparatus and validate a second MCIM of the second communication apparatus based on the second request.

17. A first communication device, comprising:
a transmission control unit configured to:
generate a first instruction to transmit a first request to an information processing apparatus for group identification information identifying a group of devices that includes plurality of second communication devices sharing at least one connection right with the first communication device to access a network;
generate a second instruction to transmit a second request to the information processing apparatus to transfer a first connection right to a second communication device based on the group identification information,
wherein the information processing apparatus invalidates a first machine communication identity module (MCIM) of the first communication apparatus and validates a second MCIM of the second communication apparatus based on the second request; and a display control unit configured to generate third instruction to display the group identification information associated with an outcome of the request.

18. A communication system, comprising:

a terminal device configured to:

generate a first instruction to transmit a first request to an information processing apparatus for group identification information identifying a group of devices that includes a plurality of additional communication devices sharing at least one connection right with the terminal device to access a network;

generate a second instruction to transmit a second request to the information processing apparatus to transfer a first connection right to a communication device, from the plurality of additional communication devices, based on the group identification information; and the information processing apparatus in communication with the terminal device, the information processing apparatus comprising:

a receiving unit configured to receive the first request and the second request from the terminal device; and a control unit configured to:

obtain the group identification information, based on the received request;

generate a second instruction to transmit the group identification information to the terminal device;

cause the terminal device to display the group identification information on a display; and invalidate a first machine communication identity module (MCIM) of the terminal device and validate a second MCIM of the communication apparatus based on the second request.

* * * * *